United States Patent
Maldonado et al.

(10) Patent No.: US 10,645,987 B2
(45) Date of Patent: May 12, 2020

(54) APPARATUS FOR IMPROVING THE NOTICEABILITY OF A HAT

(71) Applicants: Santos Anthony Maldonado, Fayette City, PA (US); Jodi Lynn Maldonado, Fayette City, PA (US); Brent Allen Clothier, Frisco, TX (US)

(72) Inventors: Santos Anthony Maldonado, Fayette City, PA (US); Jodi Lynn Maldonado, Fayette City, PA (US); Brent Allen Clothier, Frisco, TX (US)

(*) Notice: Subject to any disclaimer, the term of this patent is extended or adjusted under 35 U.S.C. 154(b) by 0 days.

(21) Appl. No.: 15/980,745

(22) Filed: May 16, 2018

(65) Prior Publication Data
US 2019/0350292 A1 Nov. 21, 2019

(51) Int. Cl.
*F21V 21/084* (2006.01)
*A42B 3/04* (2006.01)
*F21V 21/088* (2006.01)
*F21L 4/08* (2006.01)
*F21V 23/04* (2006.01)
(Continued)

(52) U.S. Cl.
CPC .............. *A42B 3/044* (2013.01); *A42B 1/244* (2013.01); *F21L 4/08* (2013.01); *F21V 21/0885* (2013.01); *F21V 23/0414* (2013.01); *H02J 7/00* (2013.01); *H05B 45/10* (2020.01); *H05B 47/11* (2020.01); *F21Y 2103/10* (2016.08); *F21Y 2115/10* (2016.08)

(58) Field of Classification Search
CPC ...... F21S 4/001; F21S 4/003; F21W 2121/00; F21W 2121/004; F21Y 2101/02
See application file for complete search history.

(56) References Cited

U.S. PATENT DOCUMENTS 4,839,777 A 6/1989 Janko
5,567,039 A * 10/1996 Sims ............... A42B 1/244
362/106
(Continued)

FOREIGN PATENT DOCUMENTS

CN 204812131 12/2015

OTHER PUBLICATIONS

2018 Coast Product Catalog, pp. 66-93 (Retrieved on Dec. 24, 2018 from https://coastportland.com/ecatalogiCOAST_2018_Catalog.pdf).

(Continued)

*Primary Examiner* — Minh D A
(74) *Attorney, Agent, or Firm* — Brent A. Clothier

(57) ABSTRACT

An apparatus is presented for improving the noticeability of a hat. The apparatus includes a light source configured to produce light upon receiving electrical energy. The apparatus also includes a mount coupled to the light source and configured to selectively attach to and detach from the hat. The mount, when attached to the hat, orients the light source to project light away from an exterior surface of the hat into an ambient environment of the hat. The exterior surface includes at least one of a left-side exterior surface and a right-side exterior surface. The apparatus additionally includes a battery receptacle electrically-coupled to the light source and having electrical contacts for coupling to one or more batteries. Hats having improved noticeability and methods for improving the noticeability of a hat are also presented.

78 Claims, 14 Drawing Sheets

(51) Int. Cl.
  *A42B 1/24* (2006.01)
  *H02J 7/00* (2006.01)
  *H05B 45/10* (2020.01)
  *H05B 47/11* (2020.01)
  *F21Y 103/10* (2016.01)
  *F21Y 115/10* (2016.01)

(56) References Cited

U.S. PATENT DOCUMENTS

| | | | |
|---|---|---|---|
| 5,575,554 A | 11/1996 | Guritz | |
| 5,613,756 A | 3/1997 | Allen | |
| 6,007,212 A | 12/1999 | Chan | |
| 6,168,286 B1 | 1/2001 | Duffy | |
| 6,223,355 B1 | 5/2001 | Irving | |
| 6,497,493 B1 | 12/2002 | Theisen | |
| 6,925,654 B2 | 8/2005 | De Silva | |
| 7,611,255 B1 | 11/2009 | Lagassey | |
| 7,690,049 B2 | 4/2010 | Golle | |
| 7,766,501 B2 | 8/2010 | Rapisarda | |
| 8,025,432 B2* | 9/2011 | Wainright | A42B 3/044 362/106 |
| 9,130,398 B2 | 9/2015 | Yeh | |
| 9,322,545 B2 | 4/2016 | Wansor | |
| 9,351,531 B1 | 5/2016 | Bennett | |
| 2007/0159810 A1 | 7/2007 | Kim | |
| 2007/0171629 A1 | 7/2007 | Langenwalter | |
| 2008/0089056 A1 | 4/2008 | Grosjean | |
| 2008/0295224 A1* | 12/2008 | Mintzer | A42B 1/245 2/209.13 |
| 2009/0067159 A1 | 3/2009 | Beneski | |
| 2009/0144887 A1 | 6/2009 | Orandi | |
| 2010/0202135 A1 | 8/2010 | Kim | |
| 2010/0251453 A1 | 10/2010 | Chen | |
| 2010/0289433 A1* | 11/2010 | Lau | A42B 1/244 315/313 |
| 2011/0075399 A1 | 3/2011 | Yuan | |
| 2011/0235311 A1 | 9/2011 | Stone | |
| 2012/0224356 A1 | 9/2012 | Fischer et al. | |
| 2013/0077289 A1 | 3/2013 | Gridley | |
| 2013/0155656 A1 | 6/2013 | Uzar | |
| 2013/0223070 A1* | 8/2013 | Baker | F21V 33/0076 362/244 |
| 2015/0016095 A1 | 1/2015 | Kretzu | |
| 2016/0015102 A1 | 1/2016 | Fonte | |
| 2016/0144775 A1 | 5/2016 | Ejiawoko | |
| 2017/0259089 A1* | 9/2017 | De Jesus | A62B 18/003 |
| 2017/0325532 A1* | 11/2017 | Gerpheide | G02B 6/00 |

OTHER PUBLICATIONS

Carson Pro Magnivisor Deluxe CP-60 (Retrieved on Dec. 24, 2018 from https://carson.com/products/magnivisor-deluxe-cp-60/).

Masterson, J. "Intelligent Machines," Construction Executive, Jul./Aug. 2016, pp. 20-30.

McIntyre, M. "Wearables Wanted Onsite," Construction Executive, Jul./Aug. 2016, pp. 34-41.

U.S. Appl. No. 15/980,743, filed May 16, 2018, 85 pages (Drawings: 18 pages, Specification: 63 pages, Original Claims: 3 pages, Abstract: 1 page).

U.S. Patent Office, Non-Final Office Action dated Aug. 19, 2019, in U.S. Appl. No. 15/980,743, 13 pages.

WIPO, International Search Report and Written Opinion dated Aug. 29, 2019, in PCT/US2019/032324, 13 pages.

U.S. Patent Office, Response filed Nov. 19, 2019 to Non-Final Office Action dated Aug. 19, 2019, in U.S. Appl. No. 15/980,743, 13 pages.

U.S. Patent Office, Final Office Action dated Jan. 8, 2020, in U.S. App. No. 15/980,743, 13 pages.

U.S. Patent Office, Summary of Applicant-Initiated Examiner Interview, filed Jan. 21, 2020 in U.S. App. No. 15/980,743, 2 pages.

* cited by examiner

APPARATUS FOR IMPROVING THE NOTICEABILITY OF A HAT

1. FIELD

The present disclosure relates generally to hats, and more particularly, to apparatus that improve the noticeability of a hat.

2. BACKGROUND

Hats are commonly used to cover a portion of a head, which typically includes a crown of the head. Hats may provide protective functionality, and due to their prominent position, may also serve as aesthetic attire that complements an overall appearance of a wearer. Moreover, hats may serve to communicate information, such as status (e.g., social, military, professional, etc.) or affiliation (e.g., religious, political, corporate, sports, etc.). As such, the usefulness of a hat may be influenced by its ability to be seen or noticed.

The noticeability of a hat typically depends on lighting conditions within its ambient environment, which affects the hat's visibility to an observer. Such dependency requires that light directly illuminate one or more surfaces of the hat. A hat entering an ambient environment of little or no illumination may thus be unnoticed by an observer, resulting in a loss of usefulness to the wearer. Such loss may include an inability of the observer to discern decorative patterns, ornamental features, textures, text, logos, and so forth, of the hat. Such loss may also involve an inability of the observer to locate the wearer, which may be relevant in situations where safety is of concern. Hats having improved noticeability are therefore desirable, especially in dim or dark environments.

BRIEF SUMMARY

In one aspect, the disclosure is directed to an apparatus for improving the noticeability of a hat. The apparatus includes a light source configured to produce light upon receiving electrical energy. The light source may include at least one of a refractive element, a reflective element, a diffractive element, and an optically-transmissive element. The apparatus also includes a mount coupled to the light source and configured to selectively attach to and detach from the hat. The mount, when attached to the hat, orients the light source to project light away from an exterior surface of the hat into an ambient environment of the hat. The exterior surface includes at least one of a left-side exterior surface and a right-side exterior surface. The apparatus additionally includes a battery receptacle electrically-coupled to the light source and having electrical contacts for coupling to one or more batteries. In some embodiments, the apparatus includes a switch configured to regulate a flow of electrical energy from the battery receptacle to the light source. In some embodiments, a charging circuit is electrically-coupled to the battery receptacle and configured to regulate at least one of a charging voltage and a charging current supplied thereto.

In another aspect, the disclosure is directed to a hat having improved noticeability. The hat includes an exterior surface that is visible when the hat is worn. The exterior surface includes at least one of a left-side exterior surface and a right-side exterior surface. The hat also includes a light source coupled to the hat and operable to produce light upon receiving electrical energy. The light source is configured to project light away from the exterior surface into an ambient environment of the hat. The hat also includes a battery receptacle having electrical contacts for coupling to one or more batteries. The battery receptacle is electrically-coupled to the light source, and in some embodiments, is configured to selectively attach to and detach from the hat. In some embodiments, the hat includes a mount coupling the light source to the hat and configured to selectively attach to and detach from the hat. The mount, when attached to the hat, orients the light source to project light away from the exterior surface into the ambient environment of the hat. In some embodiments, a charging circuit is electrically-coupled to the battery receptacle and configured to regulate at least one of a charging voltage and a charging current supplied thereto.

In an additional aspect, the disclosure is directed to a method for improving the noticeability of a hat. The method includes producing light from a light source coupled to the hat. The light source is configured to produce light upon receiving electrical energy. The method also includes orienting the light source to project light away from an exterior surface of the hat into an ambient environment of the hat. The exterior surface includes at least one of a left-side exterior surface and a right-side exterior surface. While orienting the light source, the method may optionally involve distributing light into the ambient environment using at least one of a refractive element, a reflective element, a diffractive element, and an optically-transmissive element. In some embodiments, the method includes altering an amount of electrical energy received by the light source to alter an intensity of light produced therefrom. In further embodiments, altering the amount of electrical energy includes altering the amount of electrical energy in response to an intensity of ambient light measured by a photosensor.

BRIEF DESCRIPTION OF THE DRAWINGS

Illustrative embodiments of the present disclosure are described in detail below with reference to the attached drawing figures, which are incorporated by reference herein.

Figure 1:
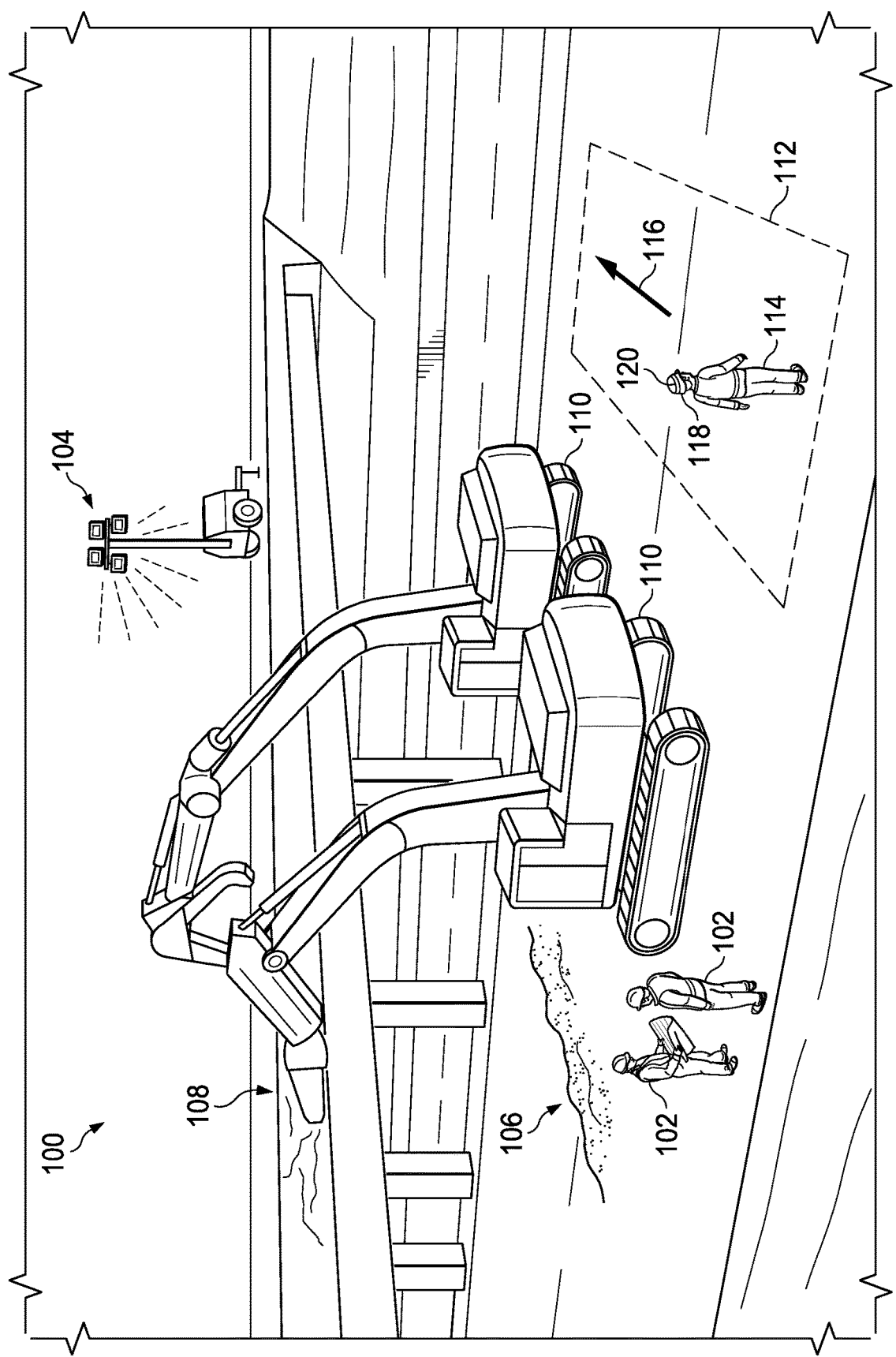
FIG. 1 is a schematic, perspective view of a construction site having workers operating at night, according to an illustrative embodiment.

The figures described above are only exemplary and their illustration is not intended to assert or imply any limitation with regard to the environment, architecture, design, configuration, method, or process in which different embodiments may be implemented.

DETAILED DESCRIPTION OF THE ILLUSTRATIVE EMBODIMENTS

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

In the drawings and description that follow, like parts are typically marked throughout the specification and drawings with the same reference numerals or coordinated numerals. The drawings (or figures) are not necessarily to scale. Certain features of the illustrative embodiments may be shown exaggerated in scale or in somewhat schematic form and some details of conventional elements may not be shown in the interest of clarity and conciseness.

Workers in many industries commonly wear impact-resistant hats or helmets adapted for tasks and environments within those specific industries. For example, and without limitation, workers in the construction industry may wear "hard" hats to protect against head injuries (e.g., from falling debris, loss of balance, etc.). In another example, workers in the firefighting industry may wear "hard" hats that, in addition to protecting against head injuries, are augmented with breathing systems to avoid inhalation of smoke and hazardous gases. In yet another example, workers in the steel industry may wear "hard" hats formed of heat-resistant materials (e.g., fiberglass) that both protect against heat injuries and shield against high temperatures associated with molten steels.

Current hats for industrial use, however, are poorly-suited to provide noticeability for a wearer in environments of little to no illumination, e.g., at night, during foggy or rainy weather, in unlit rooms, behind large equipment, underwater, and so forth. Such noticeability may involve visibility to an observer (e.g., other workers), visibility to an optical system (e.g., a camera), or both. To the extent that these hats even address noticeability, the hats may incorporate passive optical elements that require an external light source for illumination (e.g., reflective tape or paint). However, the use of such elements requires an unobscured line of sight between the hats and their corresponding external light sources. Smoke, airborne dust, fog, rain, and so forth may reduce a performance of the elements by attenuating an intensity of light along the line of sight. But even if the intensity of light is unattenuated, external light sources may be directed to illuminate objects and areas other than a hat. Thus, light reaching the hat may be indirect and reduced in intensity.

To illustrate a representative example of such a situation, FIG. 1 presents a schematic, perspective view of a construction site 100 having workers 102, 114 operating at night. The construction site 100 includes an elevated, mobile light source 104 to illuminate a portion of a roadway 106 and a portion of a bridge 108. The elevated, mobile light source 104 projects light in front of two excavators 110, but in doing so, poorly illuminates an area 112 behind the excavators 110. The area 112 is also obscured by bodies of the excavators 110, and as such, operators in the two excavators 110 have impaired visibility into the area 112. A worker 114 traversing the area 112 (see arrow 116) risks being unseen, even if wearing a hat 118 with a passive optical element 120. Should one or both excavators 110 move backwards or rotate, the worker 114 could be struck and suffer bodily injury. However, such risks could be mitigated if the hat 118 incorporates an active light source to project light away from one or more exterior surfaces of the hat into an ambient environment of the hat. By improving the noticeability of the hat 118, the visibility of the worker 114 thus improves, even though the area 112 has poor illumination and is partially obscured.

The embodiments described herein relate to hats having improved noticeability and apparatus and methods therefor. The hats include an outward-facing light source that projects light into an ambient environment of the hat. In one aspect, a hat having improved noticeability includes an exterior surface that is visible when the hat is worn. The exterior surface includes at least one of a left-side exterior surface and a right-side exterior surface. The hat also includes a light source coupled to the hat and operable to produce light upon receiving electrical energy. The light source is configured to project light away from the exterior surface into an ambient environment of the hat. A battery receptacle is electrically-coupled to the light source and includes electrical contacts for coupling to one or more batteries. In another aspect, an apparatus for improving the noticeability of a hat includes a light source configured to produce light upon receiving electrical energy. The apparatus also includes a mount coupled to the light source and configured to selectively attach to and detach from the hat. The mount, when attached to the hat, orients the light source to project light away from an exterior surface of the hat into an ambient environment of the hat. The exterior surface includes at least one of a left-side exterior surface and a right-side exterior surface.

The apparatus additionally includes a battery receptacle electrically-coupled to the light source that has electrical contacts for coupling to one or more batteries. In an additional aspect, a method for improving the noticeability of a hat includes producing light from a light source coupled to the hat. The light source is configured to produce light upon receiving electrical energy. The method also includes orienting the light source to project light away from an exterior surface of the hat into an ambient environment of the hat. The exterior surface includes at least one of a left-side exterior surface and a right-side exterior surface.

It will be understood that the hats, the apparatus, and the methods described herein may be applicable to any type of environment, including those associated with construction sites, refineries, oil and natural gas exploration, chemical processing plants, mining, fire prevention and rescue, manufacturing, metal foundries, ports and docks, and harbors. The hats, the apparatus, and the methods are also applicable in non-industrial settings such in casual and formal dress settings.

As used herein, the term "hat" refers to any type of covering for a head that includes at least a crown of the head. Non-limiting examples of a "hat" include a beanie, a top hat, a beret, a sombrero, a hard hat, a helmet, a baseball cap, a boater, a knit cap, a fedora, a cowboy hat, a balaclava, a bowler, a garrison hat, a bucket hat, a fruit hat, a Fulani hat, a kepi, an umbrella hat, a flat cap, a fez, a deerstalker, a conical hat, an eight-point cap, and an aviator hat. Other types of "hats" are possible. As used herein, the terms "front", "left", "right", and "rear"—when describing sides of the "hat" and surfaces thereof—refer to sides of the "hat" that align with respective sides of a wearer when the "hat" is worn.

The "hat" may formed of any type of material including biologically-derived materials, plastics, epoxies, metals, and ceramics. Such materials may be solid, woven into fabrics, or combined into composite structures (e.g., a plurality of layers, fibers in a matrix, etc.). Non-limiting examples of biologically-derived materials include leather, silk, wool, jute, cotton, linen, hemp, fleece, rayon, and cashmere. Non-limiting examples of plastics include aramid, polyester, nylon, polypropylene, polyethylene, polycarbonate, acrylonitrile butadiene styrene, phenol formaldehydes, and poly (methyl methacrylate). Non-limiting examples of epoxies include cured resins based on bisphenol A resin, bisphenol F resin, glycidylamine resin, aliphatic resin, and novolac resin. Non-limiting examples of metals include aluminum and aluminum alloys, steel, titanium and titanium alloys, and magnesium and magnesium alloys. Non-limiting examples of ceramics include graphite, silicon oxide, aluminum oxide, zirconium oxide, silicon carbide, silicon nitride, SiAlON, A-glass, C-glass, D-glass, E-glass, E-CR-glass, R-glass, and S-glass. The "hat" may also be formed of natural materials, including blends of natural materials with synthetic materials.

Unless otherwise specified, any use of any form of the terms "connect," "engage," "couple," "attach," or any other term describing an interaction between elements is not meant to limit the interaction to direct interaction between the elements and may also include indirect interaction between the elements described. In the following discussion and in the claims, the terms "including" and "comprising" are used in an open-ended fashion, and thus should be interpreted to mean "including, but not limited to". Unless otherwise indicated, as used throughout this document, "or" does not require mutual exclusivity.

The various characteristics mentioned above, as well as other features and characteristics described in more detail below, will be readily apparent to those skilled in the art with the aid of this disclosure upon reading the following detailed description of the embodiments, and by referring to the accompanying drawings. Other means may be used as well.

Figure 2A:
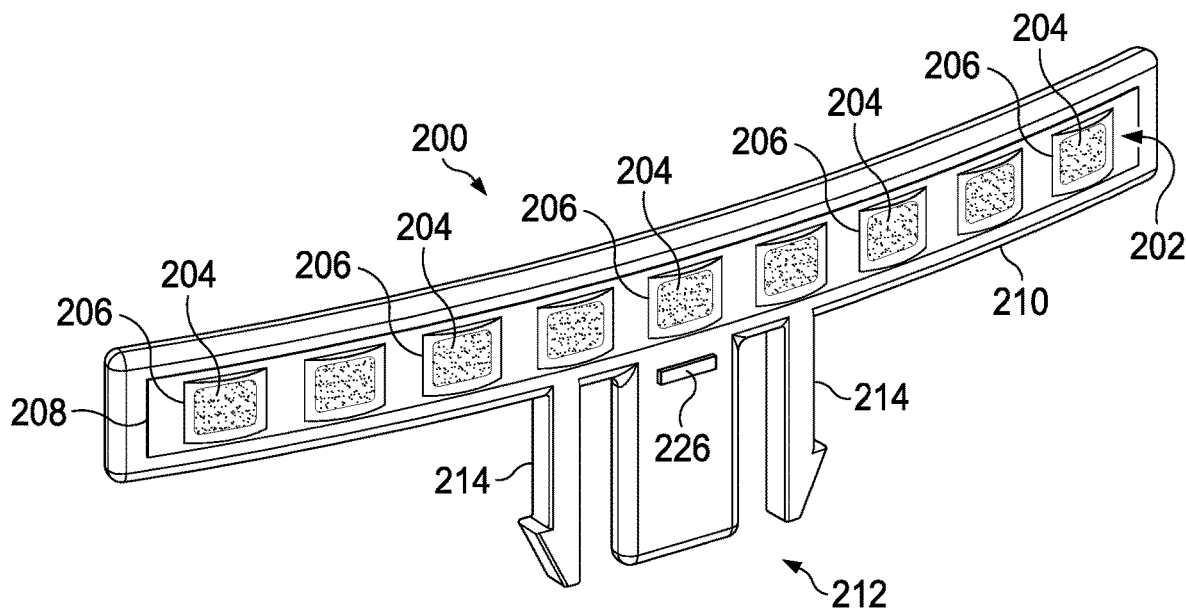
FIG. 2A is a perspective view of an apparatus for improving the noticeability of a hat, according to an illustrative embodiment.
Figure 2B:
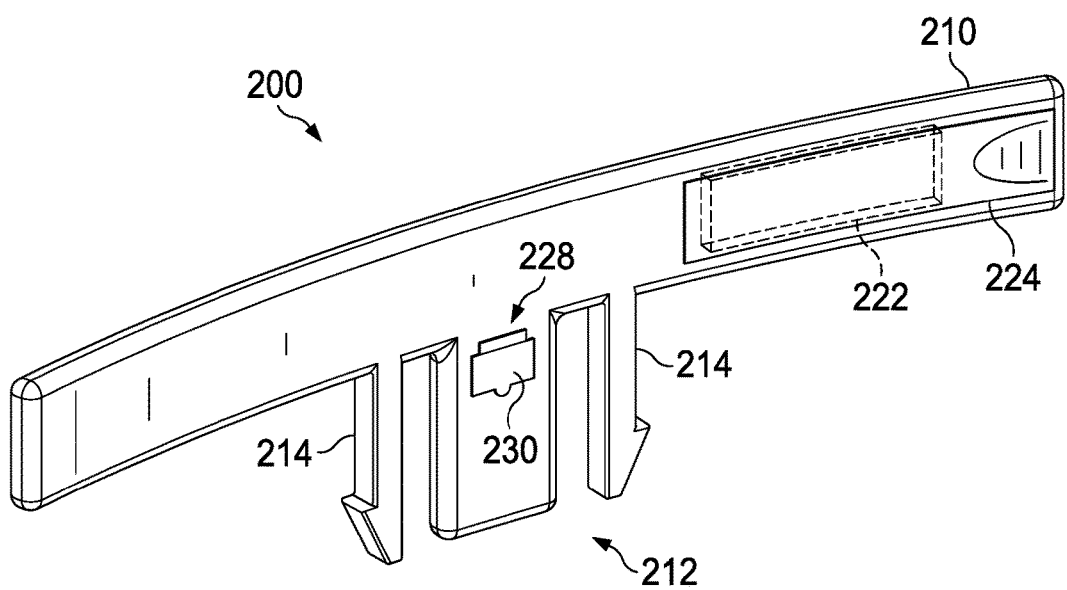
FIG. 2B is a perspective view of the apparatus of FIG. 2A, but from an opposing viewpoint, according to an illustrative embodiment.

Now referring to FIG. 2A, a perspective view is presented of an apparatus 200 for improving the noticeability of a hat, according to an illustrative embodiment. FIG. 2B presents the apparatus 200 of FIG. 2A, but from an opposing viewpoint that shows additional features of the apparatus 200. The apparatus 200 includes a light source 202 configured to produce light upon receiving electrical energy. To produce such light, the light source 202 may include one or more light-emitting elements 204 capable of converting electrical energy into emissions of electromagnetic radiation. The emissions of electromagnetic radiation can include any wavelength or combination of wavelengths in the visible spectrum (i.e., between about 380-750 nm). However, in some embodiments, other spectrums may be involved (e.g., infrared, ultraviolet, etc.) Non-limiting examples of the one or more light-emitting elements 204 include halogen lamps, incandescent lamps, light-emitting diodes, and fluorescent lamps. The one or more light-emitting elements 204 may be arranged, either individually or in groups, into any type of pattern including rows, columns, and arrays. In FIG. 2A, the light source 200 is depicted as including nine light-emitting diodes (204) in a single row. However, this depiction is not intended as limiting.

The one or more light-emitting elements 204 may include individual elements having an emission of light narrowly distributed around a central wavelength, i.e., a narrow-band emission of light. The narrow-band emission of light may have a full-width half maximum (FWHM) of up to 50 nm. In many embodiments, the FWHM is at least 20 nm but no greater than 30 nm. Non-limiting examples of the narrow-band emission of light include a red emission (i.e., 620 nm$\leq\lambda_{central}\leq$750 nm), a green emission (i.e., 495 nm$\leq\lambda_{central}\leq$570 nm), and a blue emission (i.e., 450 nm$\leq\lambda_{central}\leq$495 nm). Other types of emissions are also possible (e.g., an orange emission, a yellow emission, a violet emission, etc.). For example, and without limitation, the one or more light-emitting elements 204 may include a light-emitting diode having a narrow-band emission of green light centered at 555 nm with a FWHM of about 25 nm.

The one or more light-emitting elements 204 may also include individual elements having an emission of light broadly distributed across a spectrum, i.e., a broad-band emission of light. Non-limiting examples of the broad-band emission of light include a "soft" white light (i.e., 2500 K$\leq T_{color}\leq$3000 K), a "warm" white light (i.e., 3500 K$\leq T_{color}\leq$4100 K), and a "daylight" white light (i.e., 5000 K$\leq T_{color}\leq$6500 K). Other types of broad-band emissions are possible. For example, and without limitation, the one or more light-emitting elements 204 may include an incandescent lamp having a broad-band emission of "warm" white light corresponding to a color temperature of 2700K.

In some embodiments, the one or more light-emitting elements 204 include groups of light-emitting elements 204, each configured to produce a specific narrow-band or broad-band emission. In these embodiments, the groups of light-emitting elements 204 may be selectively energized to allow the light source 202 to produce a specific emission (or emissions) of light. For example, and without limitation, the one or more light-emitting elements 204 may include a first group of light-emitting elements 204 configured to emit a red light and a second group of light-emitting elements 204 configured to emit a "soft" white light of 3000K color temperature. The first and second groups may be energized separately such that the light source 202 produces, respectively, the red light or the "soft" white light. The first and second groups may also be energized together to produce a "soft" white light having a strong red component.

In some embodiments, the light source 202 includes at least one of a refractive element (e.g., a lens), a reflective element (e.g., a mirrored surface, a light-scattering surface, etc.), a diffractive element (e.g., a Fresnel lens, a diffractive optic, etc.), and an optically-transmissive element (e.g., a transparent plate, a light pipe, etc.). In FIG. 2A, each of the light-emitting elements 204 is disposed behind an hemispherical lens 206 formed into a transparent plate 208. The hemispherical lens 206 spreads light received from a corresponding light-emitting element 204 into a broader distribution of light. Such spreading may allow the light source 202 to better and more-uniformly illuminate an ambient environment of the hat, especially in embodiments where the light-emitting elements 204 correspond to efficient, but highly-concentrated sources of light (e.g., light-emitting diodes). The hemispherical lenses 206, the transparent plate 208, or both, may also protect the one or more light-emitting elements 204 from contamination (e.g., dust, dirt, water, mud, etc.) and contact with exterior objects (e.g., abrasion, impact, cuts, etc.).

Optical elements, such as those disclosed above, may allow the light source 202 define a distribution of light projected from the one of more light-emitting elements 204. The distribution of light may be any spatial distribution of light and may involve intensity distributions within the spatial distributions of light. Non-limiting examples of the distribution of light include a uniform distribution, a gradient distribution, and a patterned distribution. For the patterned distribution, the optical elements may include a stencil with apertures corresponding to a pattern (e.g., an array of holes, text, etc.).

The apparatus 200 also includes a mount 210 coupled to the light source 202 and configured to selectively attach to and detach from the hat. The mount 210 may be formed of any type of structural material including metals, plastics, ceramics, and composites. The mount 210 is operable to secure the light source 202, and in many embodiments, also serves as a housing for components of the apparatus 200. Non-limiting examples of such components include the light-emitting elements and optical elements; batteries and compartments therefor; electrical circuitry, printed circuit boards, and wiring; and electrical-power connectors, indicator lights, informational displays, and user-operated switches. The mount 210 may be matched to a curvature of the hat.

Figure 2C:
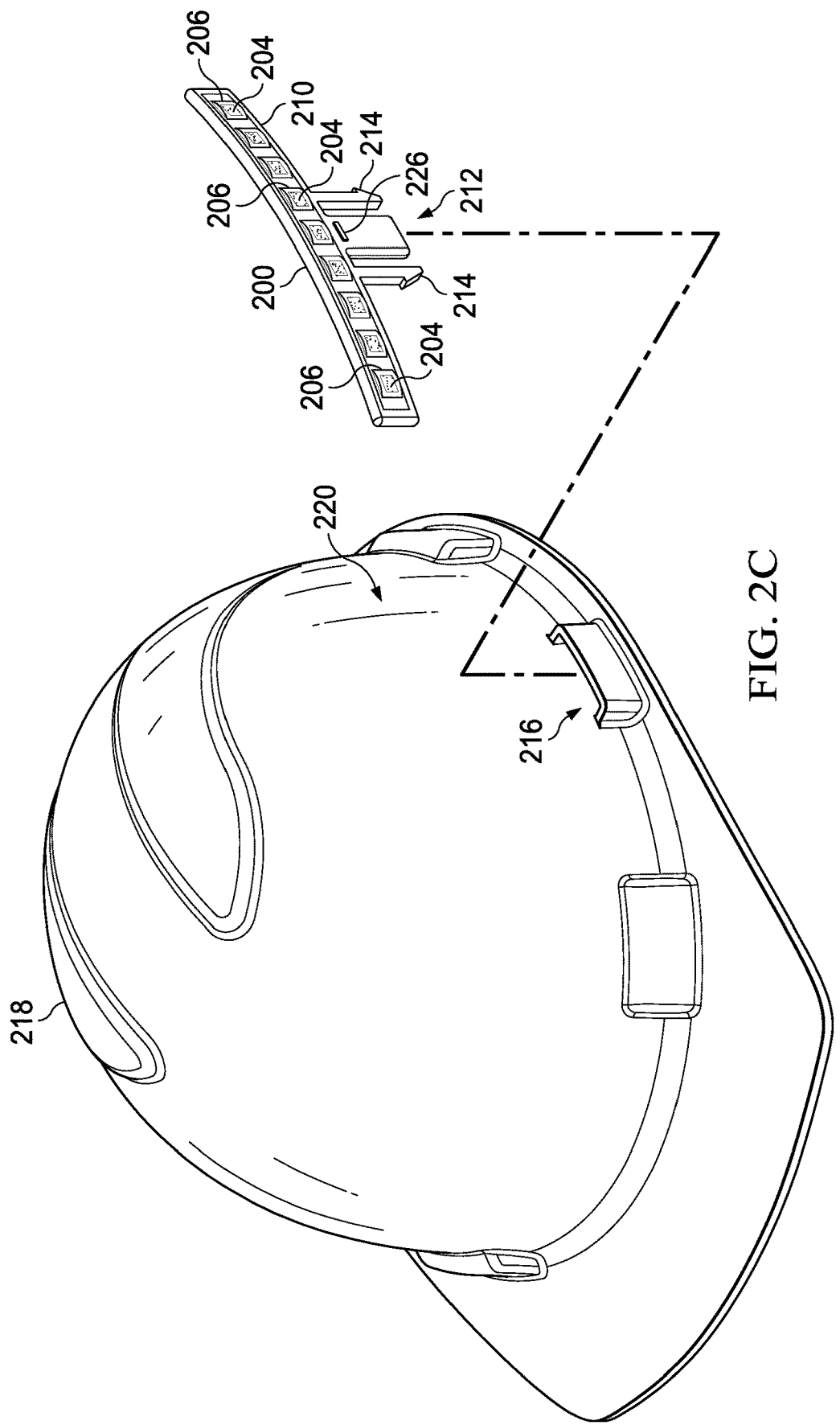
FIG. 2C is an exploded view of the apparatus of FIG. 2A showing a coupling of the apparatus to an orifice of a hat, according to an illustrative embodiment.

To selectively attach to and detach from the hat, the mount 210 may employ any type of reversible coupling. Non-limiting examples of such reversible couplings include those based on chemical adhesives, magnetic attraction, and mechanical fasteners. For example, and without limitation, the mechanical fasteners can include straps, ties, belts, clips, clasps, buckles, snaps, press studs, screws, draw latches, tension latches, toggle latches, hook and loop fasteners (e.g., Velcro®), brads, pins, and so forth. The mechanical fasteners can also involve elastic elements, such as straps, bands, or cords, capable of wrapping around or conforming to a shape of the hat. In some embodiments, such as shown FIGS. 2A & 2B, the mount 210 includes a clip 212 configured to insert into an orifice of the hat. The clip 212 is depicted in FIGS. 2A & 2B as a side-release clip with flexible detents 214 capable of locking into the orifice. However, this depiction is not intended as limiting. FIG. 2C presents an exploded view of the apparatus 200 of FIG. 2A showing a coupling (see projection line) between the clip 212 of the mount 210 and an orifice 216 of a hat 218, according to an illustrative embodiment. The coupling disposes the apparatus 200 adjacent a side of the hat 218. The hat 218 may be a "hard" hat formed of material resistant to impact (e.g., aluminum or an aluminum alloy, polyethylene, acrylonitrile butadiene styrene, a glass fiber composite, etc.).

It will be appreciated that the mount 210, when attached to the hat 218, orients the light source 202 to project light away from an exterior surface of the hat 218 into an ambient environment of the hat 218. The exterior surface includes at least one of a left-side exterior surface and a right-side exterior surface. In FIG. 2C, the exterior surface of the hat 218 includes a left-side exterior surface 220. However, this depiction is for purposes of illustration only. In some embodiments, the exterior surface includes at least one of a front-side exterior surface and a rear-side exterior surface.

The mount 210 may control a position and orientation of individual light-emitting elements 204 (and respective optical elements if present), thereby assisting the light source 202 in spreading light into the ambient environment. For example, and without limitation, the mount 210 shown in FIGS. 2A-2C disposes the one or more light-emitting elements 204 along a curvature matching that of the left-side exterior surface 220. The curvature allows the one or more light-emitting elements 204 to increase an angular distribution of light projected horizontally from the left-side exterior surface 220. In another non-limiting example, the light source 202 may include a first row of light-emitting elements canted relative to a second row of light-emitting elements. The mount 210 may dispose the light source 202 such that the first row of light-emitting elements faces slightly upwards and the second row of light-emitting elements faces slightly downwards. In this configuration, the mount 210 increases an angular distribution of light projected vertically from the left-side exterior surface 220.

The apparatus 200 additionally includes a battery receptacle 222 electrically coupled to the light source 202 and having electrical contacts for coupling to one or more batteries. The battery receptacle 222 may be disposed within the mount 210, such as depicted in FIGS. 2A-2C. However, this depiction is not intended as limiting. Other locations are possible for the battery receptacle 222. For example, and without limitation, the battery receptacle 222 may be a separate component coupled to the mount 210 via chemical adhesive, magnetic attraction, mechanical fasteners, melt bonding, and so forth. In some embodiments, the battery receptacle 222 can selectively attach to and detach from the mount 210. In these embodiments, the battery receptacle 222 may be a replaceable battery receptacle. A replaceable battery receptacle may allow damaged or degraded battery receptacles to be exchanged for properly-functioning battery receptacles.

The battery receptacle 222 may be configured for any size battery, including custom-sized batteries and standard-sized batteries (e.g., AA, AAA, AAAA, C, D, A23, 9 Volt, CR2032, LR44, etc.). Custom-sized batteries may reduce a bulk of the battery receptacle 222, which in turn, may reduce a volume occupied by the apparatus 200. The battery receptacle 222 may be configured for any type of battery, including primary (or non-rechargeable) and secondary (or rechargeable) batteries. Non-limiting examples of primary batteries include alkaline batteries and zinc-carbon batteries. Non-limiting examples of secondary batteries include silver-zinc batteries, nickel-cadmium batteries, and lithium-ion batteries. In some embodiments, the battery receptacle 222 includes the one or more batteries.

In some embodiments, the battery receptacle 222 allows the one or more batteries to be selectively inserted into and removed from the apparatus 200. For example, and without limitation, the battery receptacle 222 may include a detachable wall 224 covering an opening of a cavity (e.g., a slideable door). The detachable wall 224 facilitates removal of the one or more batteries from the apparatus 200 (e.g., for replacement or recharging). In other embodiments, the battery receptacle 222 is sealed such that the one or more batteries are non-removable. In these embodiments, the one or more batteries may have a limited number of charge-discharge cycles before the apparatus 200 becomes inoperable. For example, and without limitation, the one or more batteries may include secondary batteries that degrade rapidly after 100 charge-discharge cycles. This degradation may prevent the secondary batteries from supplying sufficient electrical energy to the apparatus 200 after 100 charge-discharge cycles. In another non-limiting example, the one or more batteries may correspond to primary batteries that irreversibly deplete after one charge-discharge cycle. It will be appreciated that, in embodiments where the battery receptacle 222 cannot be replaced and includes batteries limited to less than 20 charge-discharge cycles, the apparatus 200 may correspond to a "disposable" apparatus.

Electrical coupling of the battery receptacle 222 to the light source 202 may occur through an electrical circuit, which includes the electrical contacts of the battery receptacle 222. The electrical circuit is configured for voltages and currents of the one or more batteries. Moreover, the electrical circuit may electrically arrange the one or more batteries in a series configuration, a parallel configuration, or some combination thereof. In certain embodiments, the electrical circuit is configured such that the battery receptacle 222 can accept both primary and secondary batteries, but not in intermixed groups.

In many embodiments, the apparatus 200 includes a switch 226 configured to regulate a flow of electrical energy from the battery receptacle 222 to the light source 202. The switch 226 serves as part of the electrical circuit and regulates a voltage, a current, or both, received by the light source 202. The switch 226 may be a binary-type switch capable of transitioning between an "on" state, where electrical energy flows to the light source 202, and an "off" state, where no electrical energy flows to the light source 202. Non-limiting examples of the binary-type switch include toggle switches, push-button switches, and knife switches. Alternatively, the switch 226 may be a dimmer-type switch that, upon transitioning from an "on" state and an "off" state, progressively decreases (or increases) a magnitude of electrical energy flowing to the light source 202. Non-limiting examples of the dimmer-type switch include rotary switches and sliding switches. In some embodiments, the switch 226—whether a binary-type switch or a dimmer-type switch—is configured to selectively activate groups of light-emitting elements 204. Such groups may be associated with a characteristic, such as a location on the mount 218, an orientation on the mount 218, an emission type, a color of emission, and so forth. Groups of light-emitting elements 204 based on other characteristics are possible.

In embodiments where the battery receptacle 222 is capable of accepting secondary batteries, the apparatus 200 may optionally include a charging circuit electrically-coupled to the battery receptacle 222 and configured to regulate at least one of a charging voltage and a charging current supplied thereto. The charging circuit may reside within the mount 210, the battery receptacle 222, or some combination thereof. The charging circuit may also have a portion external to the apparatus 200 (e.g., an external AC-to-DC power converter). In some embodiments, the charging circuit is entirely external to the apparatus 200. The charging circuit is operable to recharge secondary batteries disposed within the battery receptacle 222, and may be capable of determining a state-of-charge of the secondary batteries, i.e., a percentage of full charge. Such determination may allow the charging circuit to cease supplying electrical energy to the secondary batteries when the state-of-charge reaches about 100%. In some embodiments, the charging circuit includes an indicator (e.g., a series of light-emitting diodes) or informational display (e.g., a liquid crystal display) to indicate the state-of-charge of the secondary batteries.

The charging circuit may include a connector 228 for coupling to an external power source. The connector 228 may correspond to an outer (or "female") connector. Non-limiting examples of the connector 228 include a USB port (e.g., Micro, Mini, Type-C, etc.), a two-pin connector, and a barrel connector. The connector 228 may be protected via a cover 230 from dust, dirt, and contact with exterior objects. In FIG. 2A, the cover 230 is depicted as a flexible flap coupled to the mount 210. However, this depiction is not intended as limiting.

The charging circuit may be configured to electrically-couple the apparatus 200 to an AC power source, a DC power source, or both. Such coupling may occur through a physical connection (e.g., mating connectors) or wirelessly (e.g., magnetic coupling, capacitive coupling, etc.). Non-limiting examples of the AC power source include wall outlets associated with 120 VAC and 240 VAC "mains" power lines. Non-limiting examples of the DC power source include USB ports (e.g., in cars, computers, etc.), receptacles for lighting cigarettes, and portable solar panels. In some embodiments, the charging circuit is configured to be a DC circuit. In further embodiments, the connector 228 allows the charging circuit to selectively couple to and de-couple from an external AC-to-DC power converter, such as a switching-mode power supply. The external AC-to-DC power converter may be portable so that a user can easily transport and store the external AC-to-DC power converter. It will be appreciated that, by keeping circuitry associated with the external AC-to-DC power converter separate from the apparatus 200, the charging circuit may occupy less volume in the apparatus 200. The charging circuit may also add less weight to the apparatus 200.

In some embodiments, the apparatus 200 includes a photovoltaic device coupled to the mount 210. The photovoltaic device may be any type of electric device configured to receive light and convert such light into electrical energy. In many embodiments, the photovoltaic device includes one or more photovoltaic elements electrically-coupled in series, in parallel, or some combination thereof. Non-limiting examples of such photovoltaic elements include amorphous silicon photodiodes, polycrystalline silicon photodiodes, monocrystalline silicon photodiodes, cadmium telluride photodiodes, and copper indium gallium arsenide (CIGS) photodiodes. The photovoltaic device may be electrically-coupled to the light source 202, the battery receptacle 222, or both. In some embodiments, the photovoltaic device is electrically-coupled to the battery receptacle 222 through the charging circuit (i.e., electrically-coupled to the charging circuit). In some embodiments, the photovoltaic device includes a control switch to selectively activate and deactivate the photovoltaic device.

Figure 2D:
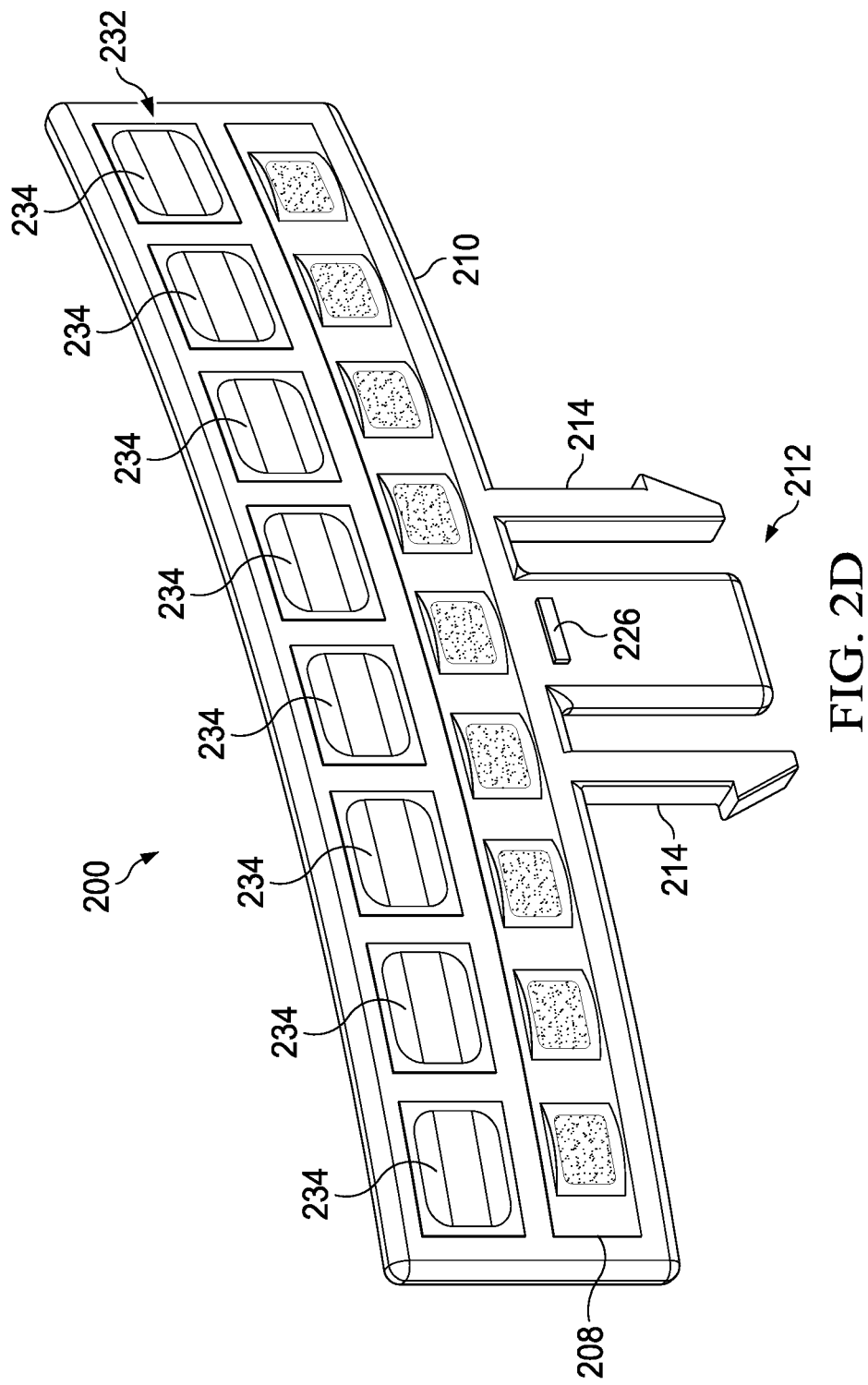
FIG. 2D is a perspective view of the apparatus of FIG. 2A, but having a photovoltaic cell coupled to a mount of the apparatus, according to an illustrative embodiment.

FIG. 2D presents a perspective view of the apparatus 200 of FIG. 2B, but having a photovoltaic device 232 coupled to the mount 210, according to an illustrative embodiment. FIG. 2D depicts the photovoltaic device 232 as having eight photovoltaic elements 234 arranged in a row. However, this depiction is not intended as limiting. The photovoltaic device 232 may have any number and arrangement of photovoltaic elements 234. The mount 210, when attached to the hat 218, orients the photovoltaic device 232 to receive light from an ambient environment of the hat 218. The photovoltaic device 232 may be disposed onto any location of the apparatus 200, provided the location allows light external to the apparatus 200 to be received by the photovoltaic device 232. The photovoltaic device 232 may include a control switch. In FIG. 2D, the control switch is disposed behind the detachable wall 224 of the battery receptacle 222 and is operable to selectively activate and deactivate the photovoltaic device 232.

During deployment, a user of the apparatus 200 attaches the mount 210 to the hat 218, which may involve inserting the clip 212 into the orifice 216 of the hat 218. The clip 212 may lock to the hat 218 via the flexible detents 214. If the hat 218 has multiple orifices, the user may attach one instance of the apparatus 200 per orifice in any combination as desired. For example, and without limitation, one instance of the apparatus 200 may be attached to each of a left side and a right side of the hat 218. After attachment, the user of the apparatus 200 may don the hat 218, becoming a wearer of the hat 218 with the apparatus 200 coupled thereto.

Upon entering an area of little to no illumination, the user (or wearer) may choose to energize the light source 202. To energize the light source 202, the user actuates the switch 226 to the "on" state, which allows electrical energy to flow from the battery receptacle 222 to the light source 202. In response, the light source 202 produces light. If the switch 226 is a dimmer-type switch, the user may adjust an intensity of light produced by the light source 202. The mount 210 orients the light source 202 to project light away from the exterior surface of the hat 218 into the ambient environment of the hat. Projection of light away from the exterior surface of the hat 218 broadcasts light into the ambient environment, thereby improving the hat's noticeability and that of the wearer.

When illumination of the hat 218 no longer desired, the user may de-energize the light source 202 by actuating the switch 226 to the "off" state. In this state, the user may choose to leave the apparatus 200 attached to the hat 218. However, in certain situations, such as those associated with battery replacement or recharging, the user may desire to detach the apparatus 200 from the hat 218. In these situations, the flexible detents 214 of the clip 212 may be displaced inward to unlock the mount 210 from the orifice 216 of the hat 218. The apparatus 200 may then be detached from the hat 218 by lifting the clip 212 out of the orifice 216.

During use of the apparatus 200, the light source 202 may deplete the one or more batteries such that insufficient electrical energy is stored therein (e.g., insufficient to energize the light source 202). Replacement of the one or more batteries is facilitated by removing the detachable wall 224 from the mount 210, which provides access to the battery receptacle 222 and the one or more batteries therein. However, if the one or more batteries correspond to secondary batteries, the user may choose instead to recharge the one or more batteries by energizing the charging circuit. Energizing the charging circuit may involve opening the cover 230 to expose the connector 228. The connector 228 is then coupled to a source of electrical energy. For example, and without limitation, the connector 228 may be coupled to an AC-to-DC power converter, which in turn, is plugged into a wall outlet suppling 120 VAC electrical power. In another non-limiting example, the connector 228 may be coupled to a DC-to-DC power converter, which in turn, is plugged into a cigarette-lighting receptacle of a vehicle. Once the one or more batteries are recharged to a level desired by the user, the charging circuit is de-energized by de-coupling the source of electrical energy from the connector 228 and closing the cover 230.

If the photovoltaic device 232 is present, the photovoltaic device 232 may be used to convert light from an ambient environment of the apparatus 200 into electrical energy. The ambient environment may correspond to that when the apparatus 200 is attached to the hat 218, or alternatively, to that when the apparatus 200 is detached from the hat 218. It will be appreciated that the photovoltaic device 232 may be used to recharge the one or more batteries when such batteries are secondary batteries. This recharging may postpone or eliminate a need to receive electrical energy from a direct source (e.g., a wall outlet, a portable solar panel, a cigarette-lighting receptacle, etc.). The photovoltaic device 232 may operate collectively with the charging circuit to recharge the one of more batteries. For example, and without limitation, the user may walk around in sunlight with the hat 218 donned and the apparatus 200 coupled thereto. Light received by the photovoltaic device 232 is converted into electrical energy, which in turn, is received by the charging circuit. The charging circuit manipulates the received electrical energy to produce an output voltage, an output current, or both, suitable for recharging the one or more batteries. Thus, during walking, the one or more batteries may charge sufficiently that use of the apparatus 200 can continue into nightfall without requiring recharging by a direct source of electrical energy.

Figure 3A:
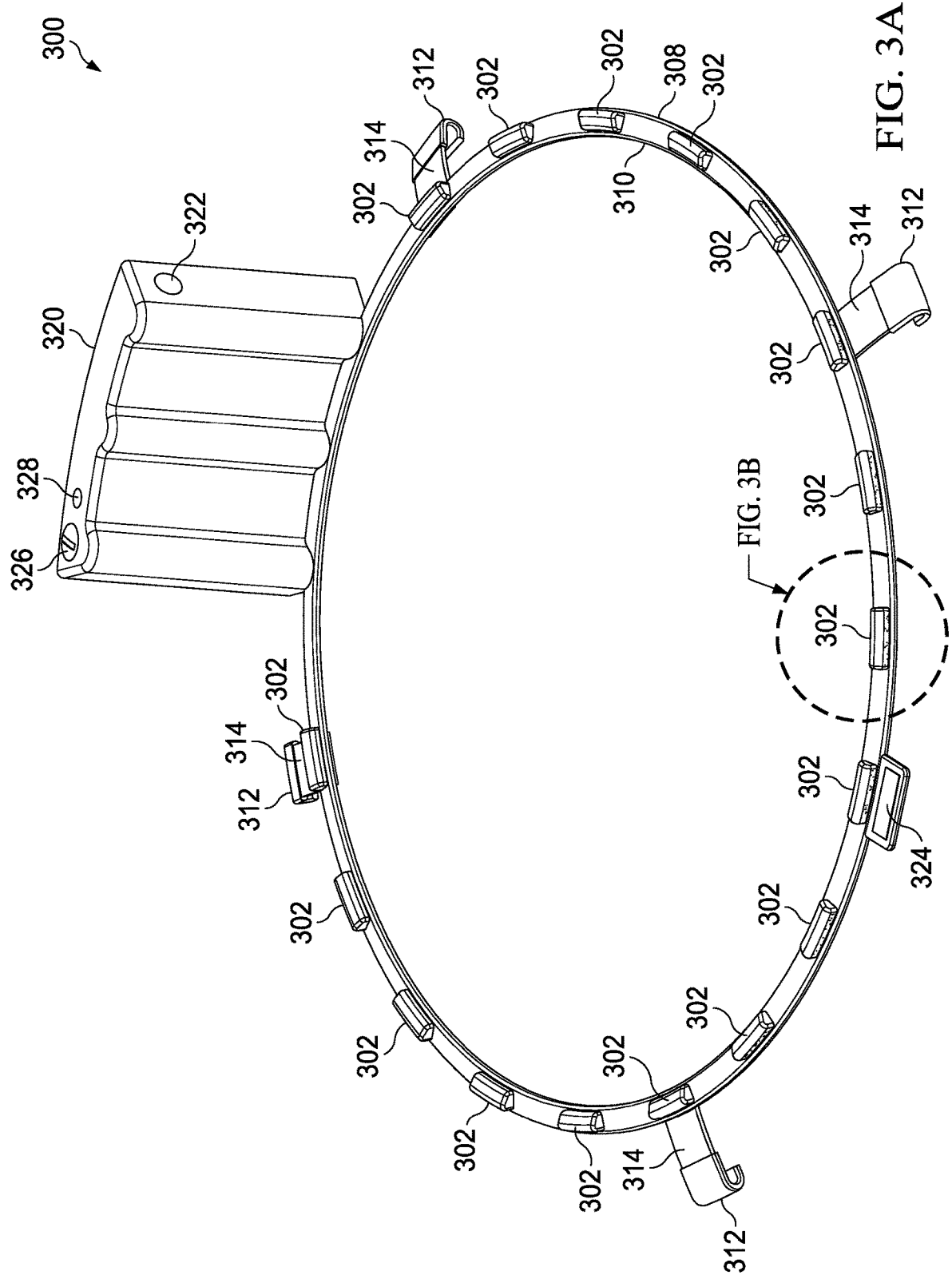
FIG. 3A is a perspective view is presented of an apparatus for improving the noticeability of a hat, but in which the apparatus is configured to project light outward from a circumferential profile, according to an illustrative embodiment.
Figure 3B:
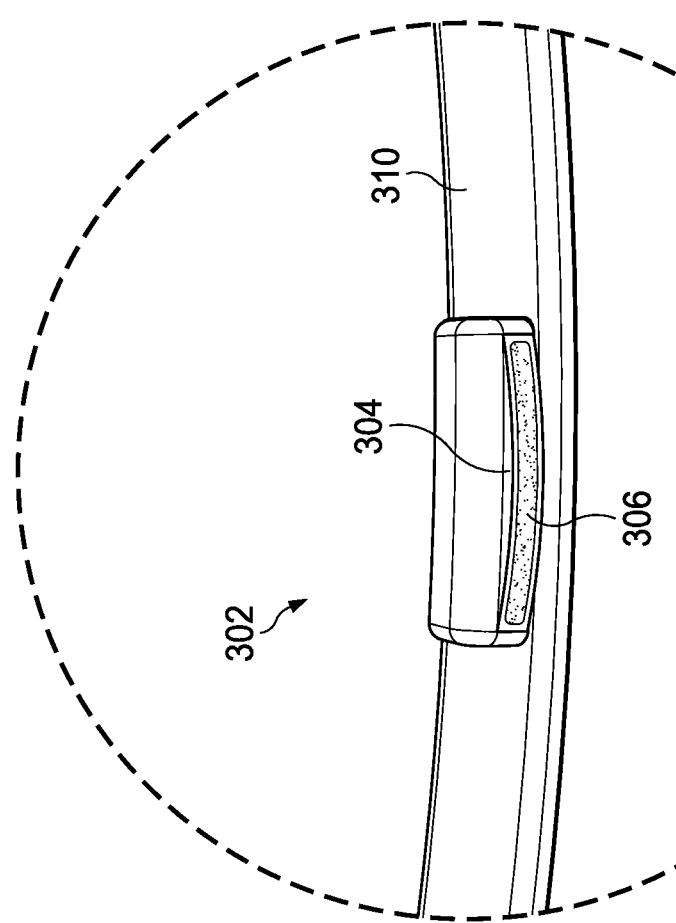
FIG. 3B is an enlarged, perspective view of an individual light source of the apparatus of FIG. 3A, according to an illustrative embodiment.

Now referring to FIG. 3A, a perspective view is presented of an apparatus 300 for improving the noticeability of a hat, but in which the apparatus 300 is configured to project light outward from a circumferential profile, according to an illustrative embodiment. The apparatus 300 includes a plurality of light sources 302 configured to produce light upon receiving electrical energy. In FIG. 3A, the plurality of light sources 302 is depicted as seventeen light sources 302. However, this depiction is not intended as limiting. Each light source 302 may have one or more light-emitting elements for producing light. FIG. 3B presents an enlarged, perspective view of an individual light source 302 of the apparatus 300 of FIG. 3A, according to an illustrative embodiment. The individual light source 302 includes a strip light-emitting diode 304 disposed behind a curved, hemispherical lens 306. The strip light-emitting diode 304 functions as a light-emitting element for the individual light source 302 and the curved, hemispherical lens 306 corresponds to a refractive element. Although FIG. 3B depicts only a single light-emitting element (i.e., a single strip light-emitting diode 304), this depiction is not intended as limiting. Other numbers of light-emitting elements are possible for the individual light source 302.

Figure 3C:
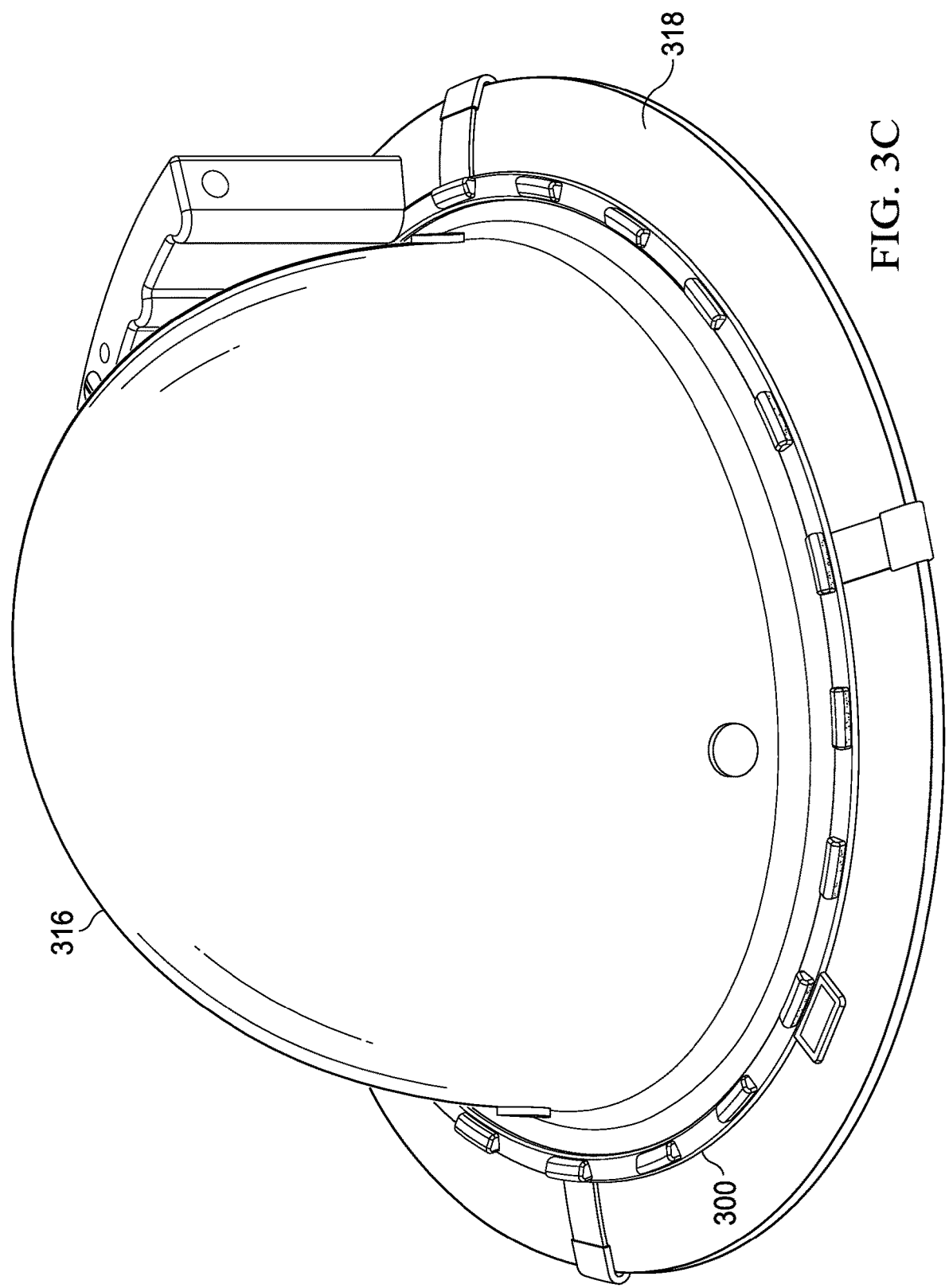
FIG. 3C is a perspective view of the apparatus of FIG. 3A attached to a hat, according to an illustrative embodiment.

Now turning back to FIG. 3A, the apparatus 300 also includes a mount 308 coupled to the plurality of light sources 302 and configured to selectively attach to and detach from the hat. The mount 308 includes a circumferential member 310 configured to encircle a perimeter of the hat. To attach to and detach from the hat, the mount 308 includes a plurality of hooks 312, each coupled to the circumferential member 310 through an elastic element 314. The plurality of hooks 312 are configured to couple to a portion of the hat, such as a brim of the hat. Upon doing so, the elastic elements 314 stretch, and due to tensile forces therein, pull the mount 310 against the hat (e.g., against the brim). It will be appreciated that the plurality of hooks 312 are disposed around the circumferential member 310 such that tensile forces in the elastic elements 314 are symmetric about the hat (i.e., the tension forces balance). FIG. 3C presents a perspective view of the apparatus 300 of FIG. 3A attached to a hat 316, according to an illustrative embodiment. Unlike the hat 218 of FIG. 2C, the hat 316 of FIG. 3C lacks any orifices for the mount 308 to selectively attach to and detach from the hat 316. The apparatus 300 is attached to the hat 316 via a brim 318, and more specifically, by coupling the plurality of hooks 312 around an edge of the brim 318.

The mount 308, when attached to the hat 316, orients the plurality of light sources 302 to project light away from an exterior surface of the hat 316 into an ambient environment of the hat 316. Due to circumferential placement of the plurality of light sources 302, the exterior surface includes a band encircling the hat 316. The plurality of light sources 302, when energized, projects light away from the band thereby creating a circumferential distribution of light. In many embodiments, the circumferential distribution provides continuous illumination. The continuous illumination is aided by the curved, hemispherical lenses 306, which broaden a distribution of light produced by each strip light-emitting diode 304. By projecting light circumferentially, the plurality of light sources 302 increases a number of vantage points from which the hat 316 can be readily seen, thereby improving its noticeability.

The plurality of light sources 302, however, is not restricted to distributions that provide continuous illumination. The plurality of light sources 302 may be configured such that the circumferential distribution provides discontinuous illumination. For example, and without limitation, the plurality of light sources 302 could correspond to three pairs of light sources, one pair disposed adjacent each of a front-side exterior surface, a left-side exterior surface, and a right-side exterior surface. Portions of the band centered between the three pairs of light sources, especially at a rear-side exterior surface, would have no light emanating therefrom, thus creating gaps in the circumferential distribution. The gaps, however, could be sufficiently insignificant to not degrade an ability to notice the hat 316, all while allowing the apparatus 300 to consume less electrical energy (i.e., due to a reduced number of light sources).

The apparatus 300 additionally includes a battery receptacle 320 electrically-coupled to the plurality of light sources 302 and having electrical contacts for coupling to one or more batteries. Electrical coupling of the battery receptacle 320 to the plurality of light sources 302 may occur through an electrical circuit, which includes the electrical contacts of the battery receptacle 320. In FIG. 3A, such electrical coupling occurs through the circumferential member 310 via conductive wiring, such as an electrical wiring harness or a flexible printed circuit board. The conductive wiring functions as part of the electrical circuit and may be embedded within the circumferential member 310.

Unlike battery receptacle 222 of FIGS. 2A-2C, which is incorporated within mount 210, the battery receptacle 320 of FIGS. 3A-3C is external to (or separate from) mount 308. In such configurations, the battery receptacle 320 may be permanently coupled to the mount 308, e.g., through chemical adhesive, mechanical fasteners, melt bonding, and so forth. Alternatively, the battery receptacle 320 may be selectively attached to and detached from the mount 308 (e.g., via snaps, screws, straps, hook and loop fasteners, pairs of magnets, etc.). In such alternate configurations, the battery receptacle 320 may correspond to a "hot-swappable" unit capable of replacement by another battery receptacle, e.g., one having fully-charged batteries. Such "hot-swap" capability may also be useful in situations where the battery receptacle 320 becomes damaged, i.e., the battery receptacle 320 can be replaced without replacing the entire apparatus 300.

The apparatus 300 includes a switch 322 configured to regulate a flow of electrical energy from the battery receptacle 320 to the plurality of light sources 302. The apparatus 300 also includes a photosensor 324 configured to measure an intensity of light in an ambient environment of the apparatus 300 (or the hat 316). The photosensor 324 is operable to regulate the flow of electrical energy from the battery receptacle 320 to the plurality of light sources 302 in response to the measured intensity of light. The photosensor 324 may serve as part of the electrical circuit and may be disposed on any outward-facing surface of the apparatus 300. Non-limiting examples of the photosensor 324 include a photodiode, a photoresistor, and a phototransistor. Although FIG. 3A depicts the apparatus 300 as having both the switch 322 and the photosensor 324, this depiction is not intended as limiting. In some embodiments, the apparatus 300 includes only the switch 322. In other embodiments, the apparatus 300 includes only the photosensor 324.

In embodiments where both the switch 322 and the photosensor 324 are present, the photosensor 324 may regulate the flow of electrical energy within bounds set by the switch 322. For example, and without limitation, the switch 322 may be a binary-type switch having an "on" state and an "off" state. In the "on" state, the switch 322 allows the battery receptacle 320 to produce a flow of electrical energy corresponding to a maximum possible flow given an instant state-of-charge in the one or more batteries. The photosensor 324 then regulates this flow of electrical energy in response to measuring the intensity of light. In the "off" state, the switch 322 blocks the flow of electrical energy to the plurality of light sources 302 and the photosensor 324 is disabled. In another non-limiting example, the switch 322 may be a dimmer-type switch that selectively sets a "cap" on the flow of electrical energy. The "cap" represents an upper limit that is equal to or less than the maximum possible flow given the instant state-of-charge in the one or more batteries. The photosensor 324 regulates the flow of electrical energy, but within a bound from zero up to and including the "cap" set by the switch 322. In the "off" state, the switch 322 blocks the flow of electrical energy to the plurality of light sources 302 and the photosensor 324 is disabled.

In some embodiments, the photosensor 324 includes a sensitivity selector 326 to alter a sensitivity of the photosensor 324 to light. Non-limiting examples of the sensitivity selector 326 include a rotary dial, a multi-position toggle, and a slide. The sensitivity selector 326 may set a lower limit, an upper limit, or both, of light intensity that the photosensor 324 responds to. In some embodiments, the photosensor 324 includes a control switch 328 to activate or deactivate the photosensor 324. In these embodiments, the control switch 328 may be operable to bypass the photosensor 324 on the electrical circuit.

During operation, the photosensor 324 may dynamically alter an intensity of projected light away from the band in response to measurements of ambient light. Such alteration can occur without intervention of the wearer and may ensure that the plurality of light sources 302 projects light with an intensity commensurate to the ambient light. For example, and without limitation, if the apparatus 300 leaves a brighter environment and enters a darker environment, the photosensor 324 may increase the flow of electrical energy to the plurality of light sources 302, thereby increasing the intensity of light projected therefrom. Conversely, if the apparatus 300 leaves a darker environment and enters a brighter environment, the photosensor 324 may decrease the flow of electrical energy to the plurality of light sources 302, thereby decreasing the intensity of light projected therefrom. Such dynamic alteration may reduce an unnecessary consumption of electrical energy by the plurality of light sources 302, especially if ambient lighting conditions change frequently.

In FIGS. 2A-3C, the light sources 202, 302 are configured to project light directly into an ambient environment. However, the embodiments of FIGS. 2A-3C are not intended as limiting. In general, a light source may utilize optical elements such that an apparatus, when attached to a hat, projects light into an ambient environment of the hat directly, indirectly, or both. For example, and without limitation, the light source may utilize a mirror or light pipe to direct light out of the apparatus from an internal light-emitting element that lacks a direct line-of-sight to the ambient environment of the hat. The internal light-emitting element thus illuminates the ambient environment indirectly via the mirror or light pipe.

As used herein, the term "indirect", when describing illumination, refers to illumination by a light source whose position, orientation, or both, precludes a direct line-of-sight to an ambient environment of a hat. Optical elements may be used to guide light from the light source into the ambient environment, which may involve a change in direction of the light. Non-limiting examples of such optical elements include a refractive element (e.g., a lens), a reflective element (e.g., a mirrored surface, a light-scattering surface, etc.), a diffractive element (e.g., a Fresnel lens, a diffractive optic, etc.), and an optically-transmissive element (e.g., a transparent plate, a light pipe, etc.). Other types of optical elements are possible.

Figure 4A:
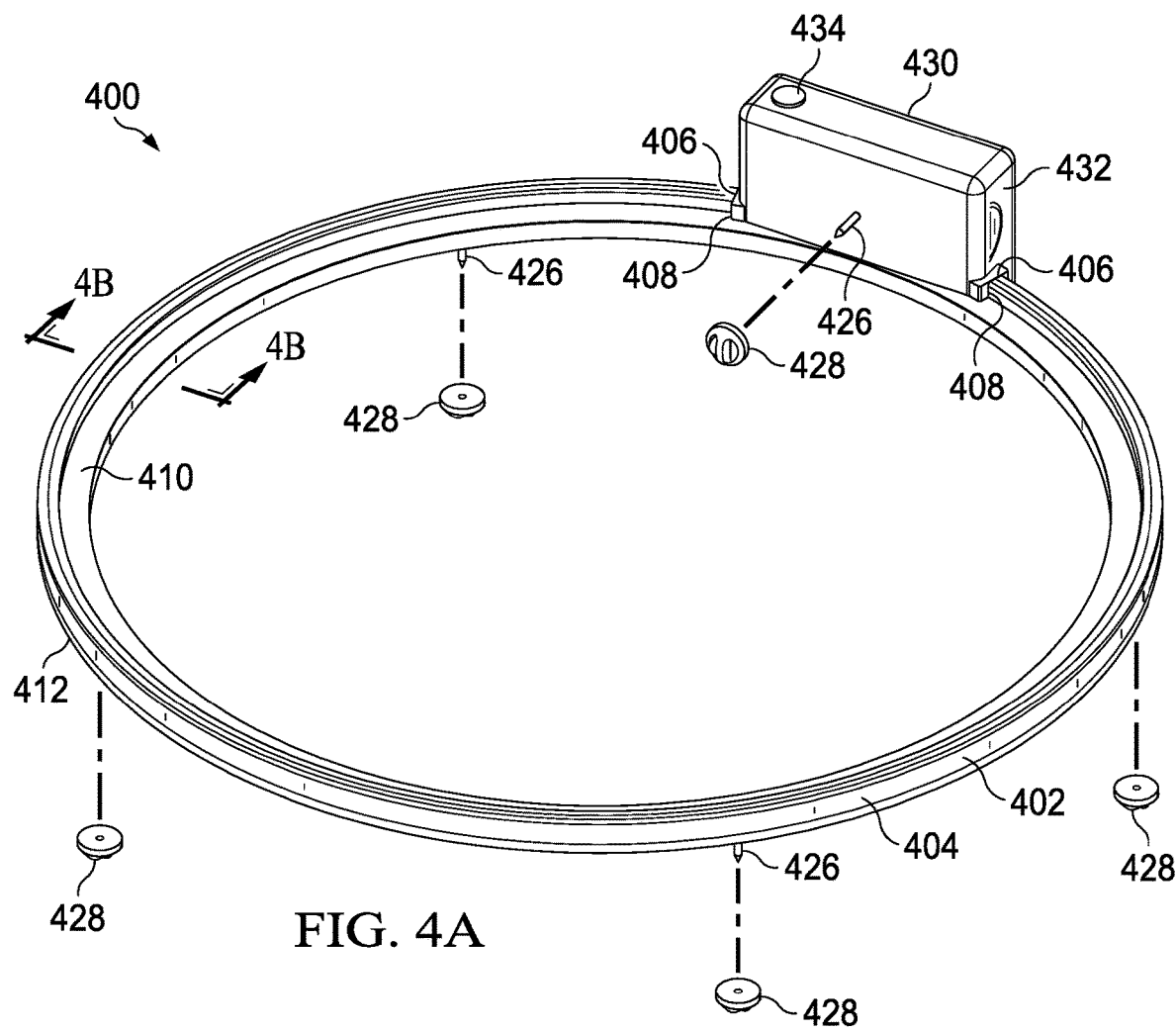
FIG. 4A is a perspective view of an apparatus for improving the noticeability of a hat and having a light source configured to indirectly illuminate an ambient environment of the hat, according to an illustrative embodiment.

FIG. 4A presents a perspective view of an apparatus 400 for improving the noticeability of a hat and having a light source 402 configured to indirectly illuminate an ambient environment of the hat, according to an illustrative embodiment. The light source 402 is configured to produce light upon receiving electrical energy and includes an optically-transmissive element 404 having a light-emitting element 406 at each end 408. In FIG. 4A, the optically-transmissive element 404 corresponds to a light pipe and the light-emitting elements 406 correspond to light-emitting diodes. However, this configuration is not intended as limiting. The optically-transmissive element 404 is capable of guiding light along a longitudinal axis thereof (e.g., by internal reflection), and may be formed of optically-transmissive material. Non-limiting examples of optically-transmissive material include silica glass, phosphate glass, fluoride glass, polystyrene polymer, polycarbonate polymer, poly(methyl methacrylate) polymer, or poly(ethylene terephthalate) polymer. The light-emitting elements 406 are optically-coupled to ends of the light pipe, such as via direct contact, optical grease, or optical epoxy. Other types of optical coupling are possible.

Figure 4B:
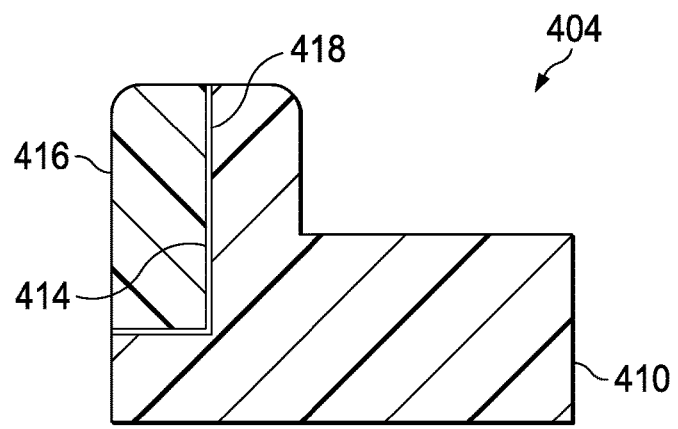
FIG. 4B is an enlarged, cross-sectional view of an optically-transmissive element seated within a mount of the apparatus of FIG. 4A, according to an illustrative embodiment.

A mount 410 is coupled to the light source 402 and configured to selectively attach to and detach from a hat. The optically-transmissive element 404 is seated within a circumferential member 412 of the mount 410 and the light-emitting elements 406 are disposed adjacent ends 408 of the optically-transmissive element 404 on the circumferential member 412. FIG. 4B presents an enlarged, cross-sectional view of the optically-transmissive element 404 seated within the mount 410, according to an illustrative embodiment. The optically-transmissive element 404 includes a first surface 414 mated against the mount 410 and a second surface 416 disposed opposite the first surface 414. In many embodiments, such as shown in FIG. 4B, the first surface 414 is optically-coupled to a reflective element 418, such as a thin metallic layer serving as a mirror (e.g., a thin layer of aluminum). The reflective element 418 is disposed between the optically-transmissive element 404 and the mount 410 and may prevent light from being absorbed within the mount 410. In some embodiments, the optically-transmissive material of the optically-transmissive element 404 includes a plurality of light-scattering centers disposed therein. The plurality of light-scattering centers may be particles or inclusions having an index of refraction different than that of the optically-transmissive material. For example, and without limitation, the optically-transmissive material may be a phosphate glass and the light-scattering centers may be particles of titanium dioxide. In another non-limiting example, the optically-transmissive material may be an amorphous matrix of poly(ethylene terephthalate) and the light-scattering centers may be crystallized inclusions of poly(ethylene terephthalate).

Figure 4C:
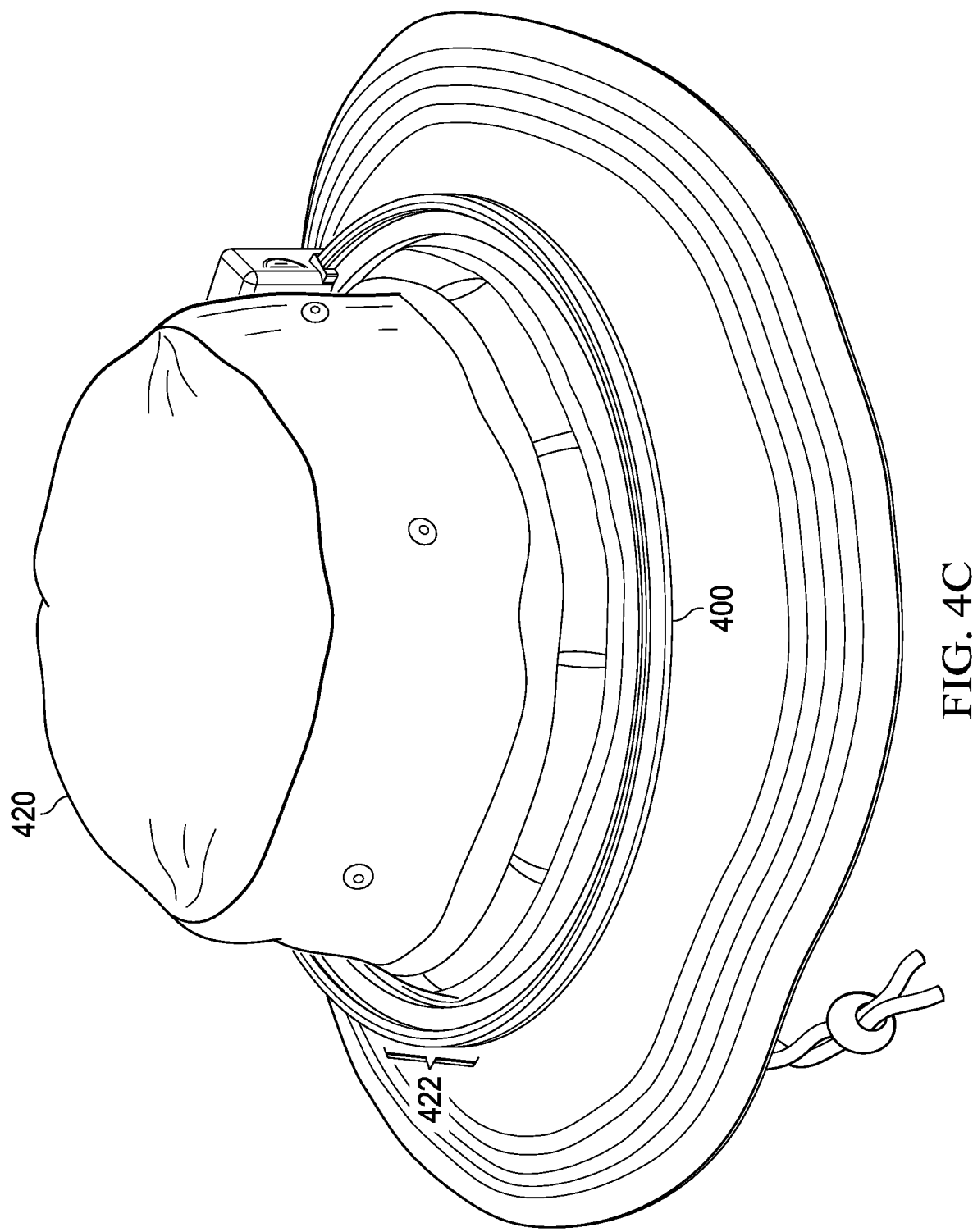
FIG. 4C is a perspective view of the apparatus of FIG. 4A attached to a hat, according to an illustrative embodiment.

The mount 410, when attached to the hat, orients the light source 402 to project light away from an exterior surface of the hat into an ambient environment of the hat. FIG. 4C presents a perspective view of the apparatus 400 of FIG. 4A attached to a hat 420, according to an illustrative embodiment. Due to a circumferential configuration of the light source 402, the exterior surface corresponds to a band 422 encircling the hat 420. The light source 402, when energized, projects light away from the band 422 thereby creating a circumferential distribution of light. The resulting distribution may be continuous and uniform in illumination, allowing the hat 420 to be noticed equally from many vantage points in the ambient environment. It will be appreciated that the optically-transmissive element 404 significantly reduces a number of light-emitting elements 406 required for the circumferential distribution of light. This significant reduction allows the apparatus 400 to consume less electrical energy when projecting light into the ambient environment. As a result, batteries in the apparatus 400 may experience notably-increased operational lifetimes.

Now turning back to FIG. 4A, the mount 410 may include one or more pairs of pins 426 and clasps 428 (or clutches) for attaching to and detaching from the hat 420. The pins 426 are integral to the mount 410 and the clasps 428 include orifices mated to receive shafts of the pins 426. A battery receptacle 430 of the apparatus 400 may also have one or more pairs of pins 426 and clasps 428 for securing the apparatus 400 to the hat 420. Although FIG. 4A depicts the apparatus 400 as having five pairs of pins 426 and clasps 428, this depiction is not intended as limiting. Other numbers and locations of pins 426 and clasps 428 are possible.

The apparatus 400 includes the battery receptacle 430, which is electrically-coupled to the light source 402 and has electrical contacts for coupling to one or more batteries. Electrical coupling of the battery receptacle 430 to the light source 402 may occur through an electrical circuit, which includes the electrical contacts of the battery receptacle 430. In some embodiments, the battery receptacle 430 allows the one or more batteries to be selectively inserted into and removed from the apparatus 400. For example, and without limitation, the battery receptacle 430 may include a detachable wall 432 covering an opening of a cavity (e.g., a slideable door). The detachable wall 432 facilitates removal of the one or more batteries from the apparatus 400 (e.g., for replacement or recharging).

In some embodiments, such as shown in FIG. 4A, the battery receptacle 430 is configured to selectively attach to and detach from the mount 410. In this configuration, the battery receptacle 430 may correspond to a "hot-swappable" unit. The apparatus 400 may include one or more pairs of electrical connectors to allow attachment and detachment of the battery receptacle 430. The one or more pairs of electrical connectors are integral to the electrical circuit and each pair has a first electrical connector mated to fit a second electrical connector. The first and second electrical connectors may share a common number of electrical contacts. Each electrical contact in the first electrical connector includes a respective mating electrical contact in the second electrical connector. In FIG. 4A, two pair of electrical connectors (not shown) are disposed between each of the light-emitting elements 406 and the battery receptacle 430. For each pair, a first electrical connector is associated with the light-emitting elements 406 and a second electrical connector is associated with the battery receptacle 430.

In many embodiments, the apparatus 400 includes a switch 434 configured to regulate a flow of electrical energy from the battery receptacle 430 to the light source 402. The switch 434 serves as part of the electrical circuit and regulates a voltage, a current, or both, received by the light source 402. In FIG. 4A, the switch 434 is depicted as a rotary-dial switch capable of progressively increasing or decreasing a magnitude of electrical energy flowing to light source 402 (i.e., a dimmer-type switch).

During deployment, a user of the apparatus 400 attaches the mount 410 to the hat 420, which involves manipulating the pins 426 and clasps 428. To do so, the user presses the pins 426 through material of the hat 420, such as a layer of woven fabric or leather, thus puncturing the hat 420. Individual clasps 428 are then slipped over portions of individual shafts protruding through the hat 420. A friction fit between orifices of the clasps 428 and their respective shafts maintains coupling between each pair of pins 426 and clasps 428. In such coupling, the hat 420 has material sandwiched between each pair of pins 426 and clasps 428. After attachment of the mount 410, the user of the apparatus 400 may don the hat 420, becoming a wearer of the hat 420 with the apparatus 400 attached thereto.

Upon entering an area of little to no illumination, the user (or wearer) may choose to energize the light source 402. To energize the light source 402, the user actuates the switch 434 to the "on" state, thereby allowing electrical energy to flow from the battery receptacle 430 to the light source 402. In response, the light source 402 produces light. The user may adjust an intensity of light produced by the light source 402 by turning the rotary-dial switch 434. Light generated by the light-emitting elements 406 travels along the longitudinal axis of the optically-transmissive element 404, eventually exiting through the second surface 41. The mount 410 orients the light source 402 such that light projects away from the band 422 (or exterior surface) into the ambient environment of the hat 420. Such projection increases the noticeability of the hat 420 and its wearer.

While traversing the optically-transmissive element 404, light from the light-emitting elements 406 may be guided by internal reflection. But to exit through the second surface 416, such light must experience a change in direction. In embodiments having the plurality of light-scattering centers, light interacts with the plurality of light-scattering centers to change direction (i.e., to scatter). Moreover, in embodiments having the reflective element 418, light reaching the first surface 414 is redirected away from the mount 410. Such redirection occurs back into the optically-transmissive element 404, and due to a cross-sectional shape of the reflective element 418, is strongly biased towards the second surface 416. Scattering and redirection of light within the optically-transmissive element 404 may increase an intensity of light exiting the second surface 416, and may also improve a uniformity of exiting light along the longitudinal axis of the optically-transmissive element 404.

It will be appreciated that the light source 402 is particularly effective in creating a broad distribution of light from a light-emitting element 406 that produces highly-concentrated light, such as a light-emitting diode. As such, a lower number of light-emitting elements 406 may be used to project light into an ambient environment of the hat 420, thus reducing a consumption of electrical energy from the one or more batteries. Such reduced consumption may increase an operational lifetime of the one or more batteries. Such reduced consumption may also decrease a frequency at which the one or more batteries need replacement or recharging.

In FIGS. 2A-4C, the apparatus are depicted as units separate from a hat. However, the apparatus may have portions integral to the hat, and in some embodiments, may be integrated entirely within the hat. Non-limiting examples of portions that can be integrated into the hat include a light source, a mount, a battery receptacle, one or more batteries, a switch, a photosensor, an electrical circuit, a recharging circuit, and a photovoltaic device. Other portions are possible. Some portions, although integral to the hat, may be configured to selectively attach to and detach from the hat (e.g., a battery receptacle). Selective attachment and detachment may facilitate replacement of such portions in an event of failure, damage, or depletion.

Figure 5A:
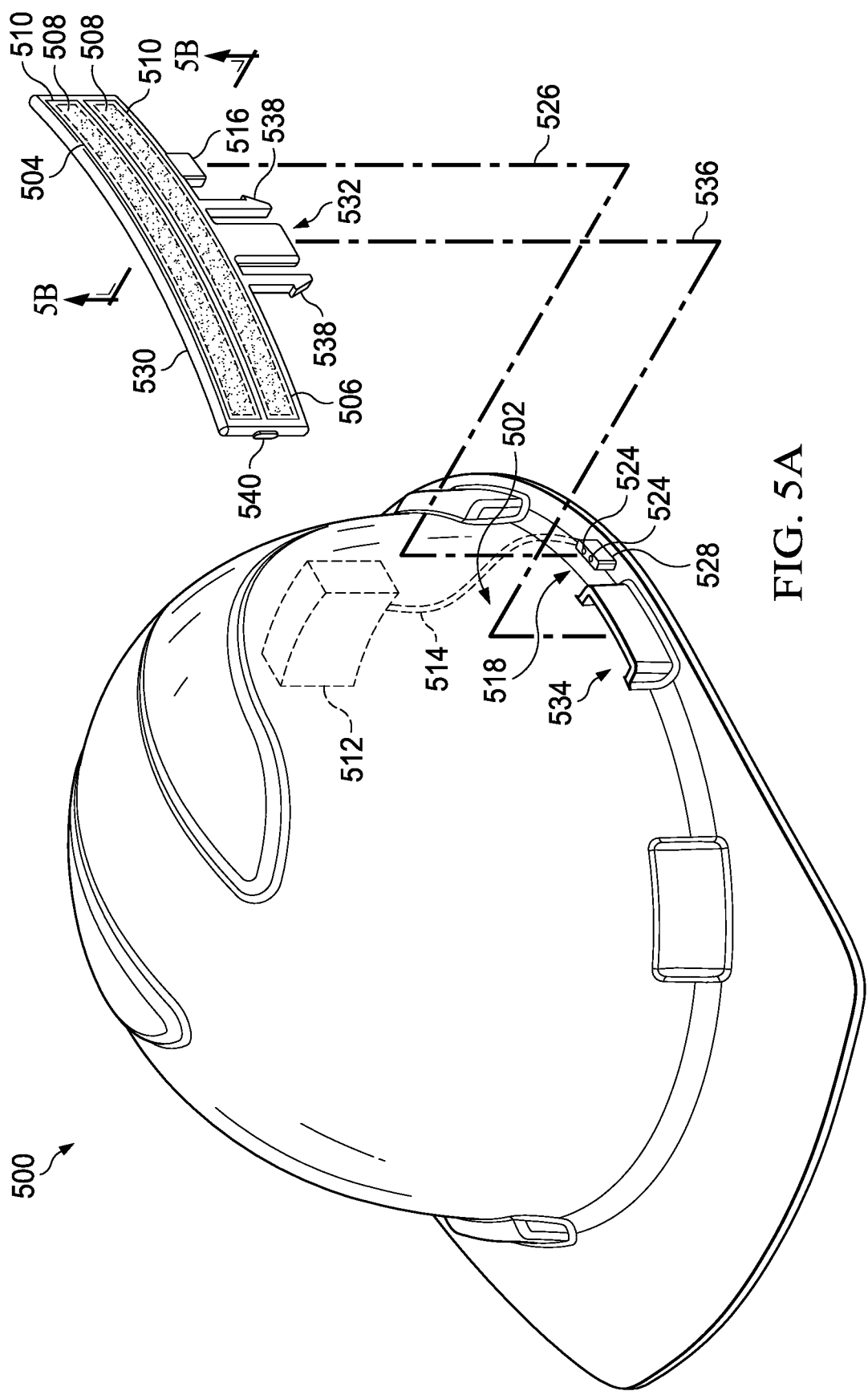
FIG. 5A is an exploded view, shown in perspective, of a hat having an exterior surface that is visible when the hat is worn, according to an illustrative embodiment.

Now referring to FIG. 5A, an exploded view, shown in perspective, is presented of a hat 500 having an exterior surface 502 that is visible when the hat 500 is worn, according to an illustrative embodiment. The hat 500 may be a "hard" hat formed of material resistant to impact (e.g., aluminum or an aluminum alloy, polyethylene, acrylonitrile butadiene styrene, a glass fiber composite, etc.). In FIG. 5A, the exterior surface 502 is depicted as a left-side exterior surface. However, this depiction is not intended as limiting. In general, the exterior surface 502 may include at least one of a left-side exterior surface and a right-side exterior surface. In some embodiments, the exterior surface 502 also includes at least one of front-side exterior surface and a rear-side exterior surface. The hat 500 includes a first light source 504 and a second light source 506 coupled thereto and operable to produce light upon receiving electrical energy. The first and second light sources 504, 506 are configured to project light away from the exterior surface 502 into an ambient environment of the hat 500.

The first and second light sources 504, 506 may include one or more light-emitting elements and one or more optical elements. Such elements may be analogous to those described in relation to FIGS. 2A-4C. In FIG. 5A, both light sources 504, 506 are depicted as having a strip light-emitting diode 508 disposed behind a translucent or frosted plate 510. The translucent or frosted plate 510 may scatter light from the strip light-emitting diode 508, thereby providing a more uniform illumination. The depiction of the first and second light sources 504, 506 in FIG. 5A, however, is not intended as limiting. Other configurations of the light sources 504, 506 are possible. In some embodiments, the first and second light sources 504, 506 include at least one of a refractive element, a reflective element, a diffractive element, and an optically-transmissive element.

The hat 500 also includes a battery receptacle 512 electrically-coupled to the first and second light sources 504, 506 and having electrical contacts for coupling to one or more batteries. Such electrical coupling may occur through an electrical circuit, which includes the electrical contacts of the battery receptacle 512. In some embodiments, the battery receptacle 512 is configured to selectively attach to and detach from the hat 500. In these embodiments, the battery receptacle 512 may be replaceable (e.g., due to damage, degraded batteries therein, etc.). In FIG. 5A, the battery receptacle 512 is depicted as coupled to an interior surface or the hat 500. FIG. 5A also depicts the electrical circuit as having conductive wiring 514 and a pair of electrical connectors 516, 518. However, this depiction is not intended as limiting. Other locations are possible for the battery receptacle 512, and the electrical circuit may have elements different than (or in addition to) the conductive wiring 514 and the pair of electrical connectors 516, 518.

Figure 5B:
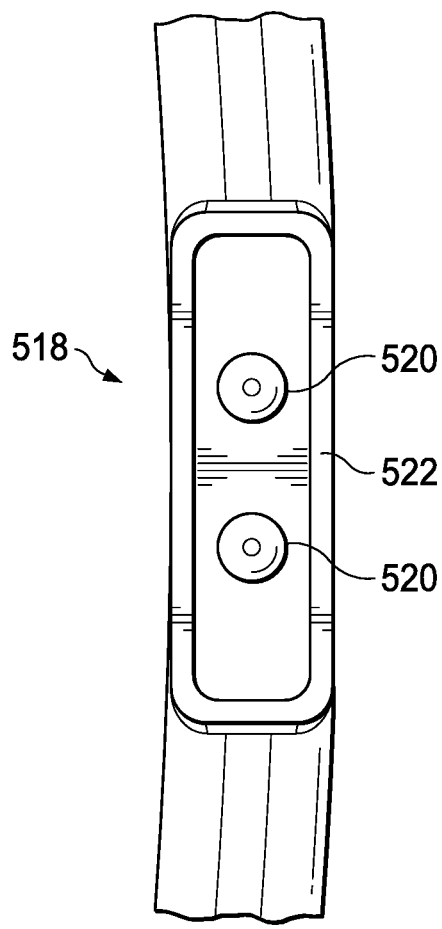
FIG. 5B is an enlarged, perspective view of a second electrical connector of the hat of FIG. 5A, according to an illustrative embodiment.

The pair of electrical connectors 516, 518 includes a first electrical connector 516 configured to mate with a second electrical connector 518. FIG. 5B presents an enlarged, perspective view of the second electrical connector 518 of FIG. 5A, according to an illustrative embodiment. The second electrical connector 518 includes a plurality of conductive pins 520 disposed within a shroud 522. The plurality of conductive pins 520 is positioned within the shroud 522 to allow insertion into mating orifices 524 of the first electrical connector 516 (see projection line 526). The mating orifices 524 are formed into a protrusion 528 of the hat 500 and include electrically-conductive contacts therein. The shroud 522 and the protrusion 528 are operable to protect the plurality of conductive pins 520 and the electrically-conductive contacts, respectively, from contact with exterior objects. Such protection may include forming a seal when the pair of electrical connectors 516, 518 is coupled (e.g., via a friction fit, an O-ring, a gasket, etc.).

For recharging secondary batteries, the hat 500 may optionally include a charging circuit electrically-coupled to the battery receptacle 512 and configured to regulate at least one of a charging voltage and a charging current supplied thereto. The charging circuit may be capable of determining a state-of-charge of the secondary batteries, i.e., a percentage of full charge. Such determination may allow the charging circuit to cease supplying electrical energy to the secondary batteries when the state-of-charge reaches about 100%. In some embodiments, the charging circuit includes an indicator (e.g., a series of light-emitting diodes) or informational display (e.g., a liquid crystal display) to indicate the state-of-charge of the secondary batteries. The charging circuit may include a connector for coupling to an external power source, which in some embodiments, is integral to the battery receptacle 512. The connector may correspond to an outer (or "female") connector.

The hat 500 additionally includes a mount 530 coupling the first and second light sources 504, 506 to the hat 500 and configured to selectively attach to and detach from the hat 500. The mount 530, when attached to the hat 500, orients the first and second light sources 504, 506 to project light away from the exterior surface 502 of the hat 500 into an ambient environment of the hat 500. The mount 530 may be formed of any type of structural material including metals, plastics, ceramics, and composites. In some embodiments, such as shown in FIG. 5A, the mount 530 includes a clip 532 configured to insert into an orifice 534 of the hat 500 (see projection line 536). The clip 532 may be a side-release clip with flexible detents 538 capable of locking into the orifice 534. It will be appreciated that the mount 530 allows instances of the first and second light sources 504, 506 to be disposed into any orifice of the hat 500 (e.g., on a left side, a right side, etc.). It will also be appreciated that the mount 530 allows the battery receptacle 512 to be associated with the hat 500 while being physically independent of the light sources 504, 506. Thus, the light sources 504, 506 via the mount 530, may selectively attach to and detach from the hat 500 without involving the battery receptacle 512. Conversely, in embodiments where the battery receptacle 512 can selectively attach to and detach from the hat 500, the battery receptacle 512 can be removed from the hat 500 without involving the light sources 504, 506 (e.g., to replace or recharge the one or more batteries).

In FIG. 5A, the exploded view of the hat 500 emphasizes a left side, while obscuring a right side. However, it will be understood that the hat 500 may include instances of the orifice 534 on both the left side and the right side. Thus, instances of the mount 530 may be selectively attached to or detached from the left side, the right side, or both. In these embodiments, the exterior surface 502 includes at least one of a left-side exterior surface and a right-side exterior surface. However, the depiction of FIG. 5A is not intended as limiting. In general, the mount 530 may be coupled to the hat 500 in any position that allows the first and second light sources 504, 506 to project light away from an exterior surface of the hat 500 into an ambient environment of the hat 500.

In many embodiments, the hat 500 includes a switch 540 configured to regulate a flow of electrical energy from the battery receptacle 512 to the first and second light sources 504, 506. The switch 540 may be a binary-type switch capable of progressively cycling through an "off" state, a first "on" state, a second "on" state, and back to the "off" state. The first "on" state and second "on" state may activate, respectively different types of illumination. For example, and without limitation, the first and second light sources 504, 506 may each include two groups of light-emitting elements, one dedicated to a broad-band emission of light (e.g., a white light) and the other dedicated to a narrow-band emission of light (e.g., a green light). In this configuration, the switch 540 allows a wearer to selective illuminate type as desired (e.g., no light, white light, or green light). Such selection may allow the user to communicate information to one or more observers (e.g., busy, inactive, injured, etc.) in addition to improving the noticeability of the hat 500.

Figure 6:
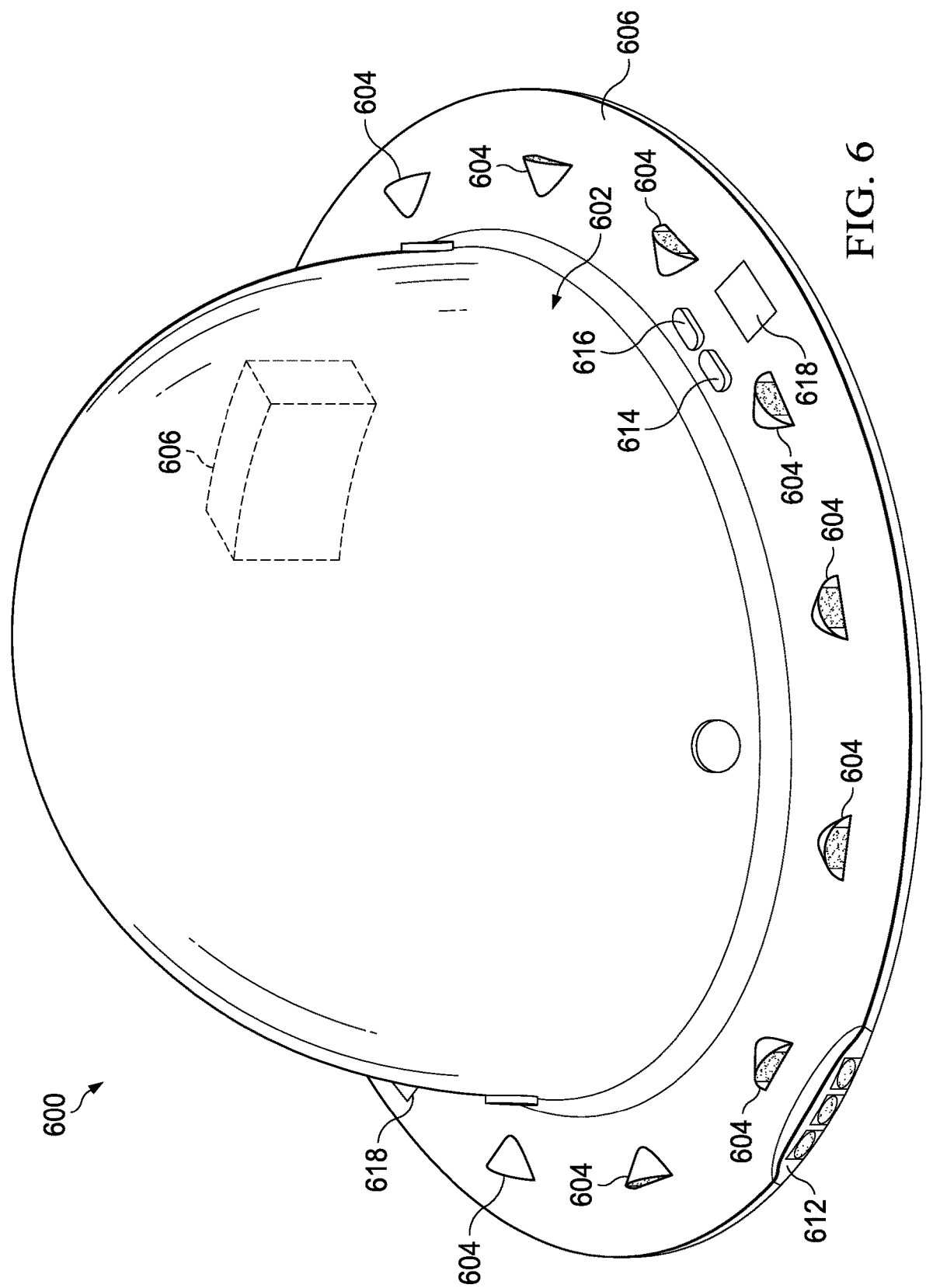
FIG. 6 a perspective view of a hat having an exterior surface that is visible when the hat 600 is worn, but in which a portion of the hat orients a light source to project light away from the exterior surface, according to an illustrative embodiment.

Although FIGS. 5A-5C illustrate embodiments in which the mount 524 is separate from the hat 500, these embodiments are not intended as limiting. In other embodiments, a mount may be integral to a hat. FIG. 6 presents a perspective view of a hat 600 having an exterior surface 602 that is visible when the hat 600 is worn, but in which a portion of the hat 600 orients a light source 604 to project light away from the exterior surface 602, according to an illustrative embodiment. The portion of the hat 600 functions analogously to a mount and includes a brim 606. However, unlike a mount, the portion does not selectively attach to or detach from the hat 600.

The light source 604 is coupled to the hat 600 and operable to produce light upon receiving electrical energy. The light source 604 is configured to project light away from the exterior surface 602 into an ambient environment of the hat 600. The light source 604 corresponds to a plurality of light sources 604 disposed along a perimeter of the hat 600. As such, the exterior surface 602 includes a band encircling the hat 600. Each of the plurality of light sources 604 may include one or more light-emitting elements and one or more optical elements. Such elements are analogous to the light-emitting elements and optical elements described in relation to FIGS. 2A-4C. In FIG. 6, each light source 604 is depicted as having a single light-emitting element disposed behind an elliptical lens formed into a transparent plate. However, this depiction is for purposes of illustration only. Other numbers, arrangements, and types of light-emitting elements are possible, including other numbers, arrangements, and types of optical elements.

The hat 600 includes a battery receptacle 608 electrically-coupled to the plurality of light sources 604 and having electrical contacts for coupling to one or more batteries. Such electrical coupling may occur through an electrical circuit, which includes the electrical contacts of the battery receptacle 608 and may include conductive wiring (e.g., an electrical wiring harness, a flexible printed circuit board, etc.). The conductive wiring may be embedded within the hat 600, such as within the brim 606. FIG. 6 depicts the battery receptacle 608 as disposed on a rear side of the hat 600 and above the brim 606. However, this depiction is not intended as limiting. Other locations and configurations of the battery receptacle 608 are possible. For example, and without limitation, the battery receptacle 608 may be coupled to the brim 606. In some embodiments, the battery receptacle 608 is configured to selectively attach to and detach from the hat 600.

In some embodiments, such as shown in FIG. 6, the plurality of light sources 604 is a first light source and the hat 600 includes a second light source 612. The second light source 612 is electrically-coupled to the battery receptacle 608 and is configured to illuminate an ambient environment in front of the hat 600. Such illumination may improve a vision of a wearer under conditions of otherwise poor or no ambient lighting. Similar to the plurality of light sources 604 (or the first light source), the second light source 612 may include one or more light-emitting elements and one or more optical elements. The hat 600 may include a first switch 614 configured to regulate a first flow of electrical energy to the plurality of light sources 604 (or the first light source), and a second switch 616 configured to regulate a second flow of electrical energy to the second light source 612. The first switch 614 and the second switch 616 may be binary-type switches or dimmer-type switches as described in relation to the switches 226, 322 of FIGS. 2A-3C.

In some embodiments, the hat 600 includes a photosensor 618 configured to regulate the first flow of electrical energy, the second flow of electrical energy, or both, in response to an intensity of light measured in the ambient environment of the hat 600. The photosensor 618 may disposed at any position on the hat 600 capable of receiving light from the ambient environment. Accordingly, the hat 600 may include a plurality of photosensors 618. In FIG. 6, the hat 600 is depicted as having two photosensors 618, one each on a left side and a right side of the hat 600. However, this depiction is not intended as limiting.

In embodiments having the plurality of photosensors 618, the flows of electrical energy may be altered in response to a controlling intensity of light. The controlling intensity of light may correspond to that measured by an individual photosensor or a plurality of photosensors. Non-limiting examples of the controlling intensity of light include a minimum intensity of light, a maximum intensity of light, and an average intensity of light. For example, and without limitation, the photosensor 618 on the left side may experience a temporary increase in ambient light conditions (e.g., light from headlights of an oncoming car). The photosensor 618 on the left side therefore measures an intensity of light higher than the photosensor 618 on the right side. If the controlling intensity corresponds to a maximum intensity of light, the photosensor 618 on the left side governs any alteration in the flow of electrical energy. Conversely, if the controlling intensity corresponds to a minimum intensity of light, the photosensor 618 on the right side governs any alteration in the flow of electrical energy. If the controlling intensity corresponds to an average intensity of light, both photosensors 618 govern the alteration of the flow of electrical energy, i.e., an average of the measured intensities of light is used in any alteration of the flow of electrical energy. It will be appreciated that the controlling intensity of light may allow the hat 600 to improve its noticeability despite different or changing light sources within the ambient environment.

Figure 7A:
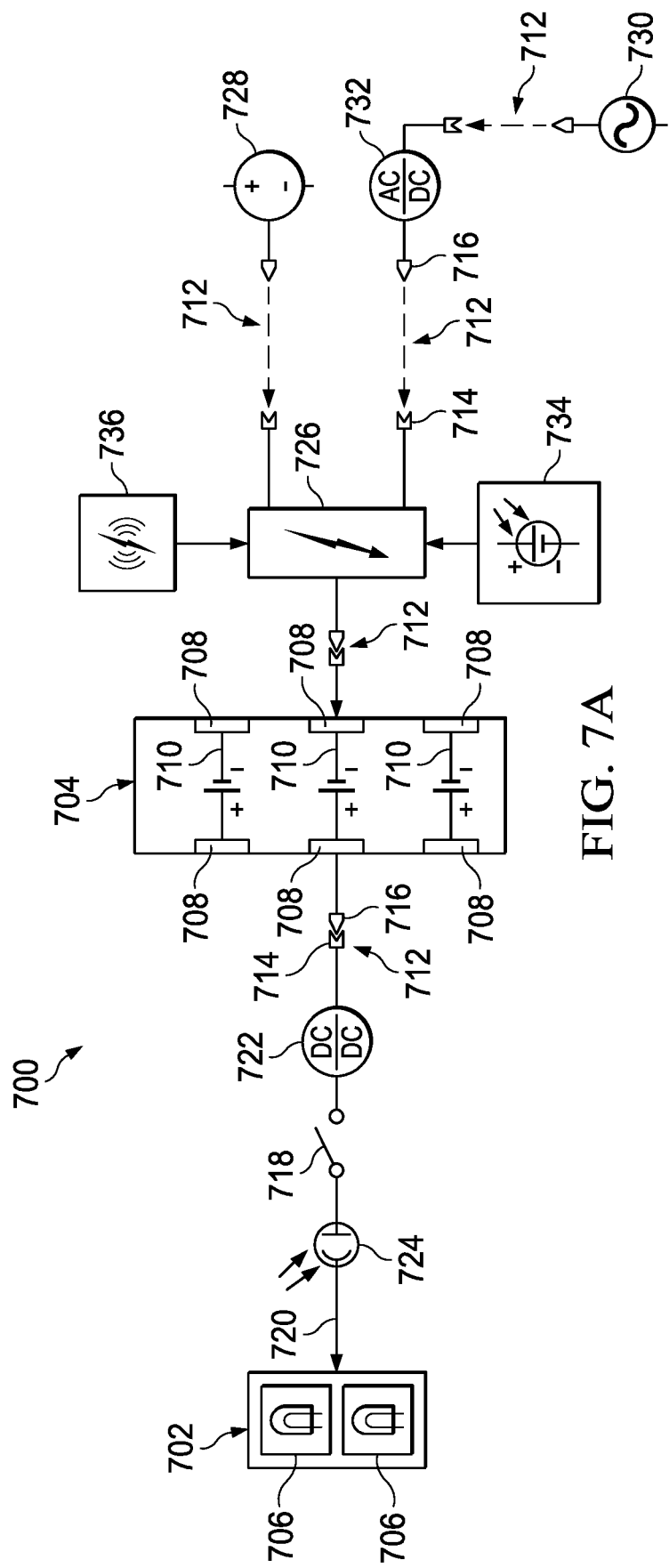
FIG. 7A is a schematic diagram of an electronic circuit having a light source electrically-coupled to a battery receptacle, according to an illustrative embodiment.

Now referring to FIG. 7A, a schematic diagram is presented of an electronic circuit 700 having a light source 702 electrically-coupled to a battery receptacle 704, according to an illustrative embodiment. The electronic circuit 700 may be analogous to the electronic circuits described in relation the apparatus and hats of FIGS. 2A-6. The light source 702 is configured to produce light upon receiving electrical energy and includes one or more light-emitting elements 706 for such purposes. The light source 702 is also configured to illuminate an exterior surface of a hat (e.g., by being coupled to a mount, integrated into a portion of the hat, etc.). The battery receptacle 704 has electrical contacts 708 for coupling to one or more batteries 710. The one or more batteries 710 may be coupled in series, in parallel, or some combination thereof, to supply a voltage, a current, or both, from the battery receptacle 704 to the light source 702 (or the one or more light emitting elements 706). In FIG. 7A, flows of electrical power flow are illustrated using solid or dashed lines with arrows indicating a direction of such flows.

In some embodiments, the battery receptacle 704 (or the electrical circuit 700) includes a pair of electrical connectors 712 for selectively attaching to and detaching from the electrical circuit 700. FIG. 7A depicts the battery receptacle 704 as having two pairs of electrical connectors 712. However, this depiction is not intended as limiting. Other numbers of pairs are possible. The pair of electrical connectors 712 includes a first electrical connector 714 mated to fit a second electrical connector 716. In some embodiments, the first and second electrical connectors 714, 716 share a common number of electrical contacts (e.g., 1, 2, 3, 4, 8, etc.). In these embodiments, each electrical contact in the first electrical connector 714 includes a respective mating electrical contact in the second electrical connector 716. In some embodiments, the first electrical connector 714 corresponds to an outer (or "female") connector and the second electrical connector 716 corresponds to an inner (or "male") connector. It will be appreciated that the pair of electrical connectors 712 may allow the battery receptacle 704 to function as a "hot-swappable" unit.

In many embodiments, the electrical circuit 700 includes a switch 718 configured to regulate a flow of electrical energy from the battery receptacle 704 to the light source 702. The switch 718 is disposed on a segment 720 of the electrical circuit 700 between the battery receptacle 704 and the light source 702. The switch 718 may be a binary-type switch or a dimmer-type switch as described in relation to the switches 226, 322 of FIGS. 2A-3C. The segment 720 may include conductive wiring, such as an electrical wiring harness or a flexible printed circuit board, to electrically couple components disposed on the segment 720.

In some embodiments, the light source 702 may require voltages, currents, or both different than those supplied by the battery receptacle 704. In these embodiments, a DC-to-DC power converter 722 may be optionally disposed on the segment 720 between the battery receptacle 704 and the switch 718. The DC-to-DC power converter 722 is operable to alter at least one of a voltage, a current, or both, supplied by the battery receptacle 704. Non-limiting examples of DC-to-DC power converter 722 include a step-up DC-DC regulator, a DC boost converter, a step-down DC-DC regulator, and a DC buck converter. In some embodiments, the DC-to-DC power converter 722 is integral to the battery receptacle 704.

In some embodiments, the electrical circuit 700 includes a photosensor 724 configured to measure an intensity of light in an ambient environment of the electrical circuit 700 and, in response, regulate the flow of electrical energy from the battery receptacle 704 to the light source 702. The ambient environment of the electrical circuit 700 may correspond to an ambient environment of an apparatus or hat as described in relation to FIGS. 2A-6. The photosensor 724 may be disposed on the segment 720 between the switch 718 and the light source 702, and during operation, dynamically alters an illumination of the exterior surface of the hat in response to measurements of ambient light. Such alteration occurs without intervention of a user and may ensure that the light source 702 illuminates the exterior surface with an intensity of light commensurate to the ambient light.

In some embodiments, the electrical circuit 700 includes a charging circuit 726 electrically-coupled to the battery receptacle 704 and configured to regulate at least one of a charging voltage and a charging current supplied thereto. The charging circuit 726 allows the electrical circuit 700 to recharge secondary batteries disposed in the battery receptacle 704. Electrical coupling between the charging circuit 726 and the battery receptacle 704 may involve a pair of electrical connectors 712, as shown in FIG. 7A. However, in some embodiments, the charging circuit 726 is integral to the battery receptacle 704. In other embodiments, a portion of the charging circuit 726 is integral to the battery receptacle 704. The charging circuit 726 may include a pair of electrical connectors 712 for electrically-coupling to an external power source. FIG. 7A depicts two such external power sources, i.e., a DC power source 728 and an AC power source 730. One pair of electrical connectors is dedicated to each of the DC power source 728 and the AC power source 730. Dashed arrows indicate uncoupled connections. However, this depiction is not intended as limiting.

In some embodiments, the charging circuit 726 is configured to be a DC circuit. In further embodiments, the electrical circuit 700 includes an external AC-to-DC power converter 732, such as a switching-mode power supply. The external AC-to-DC power converter 732 may be portable so that a user can easily transport and store the external AC-to-DC power converter 732. It will be appreciated that, by keeping circuitry associated with the external AC-to-DC power converter 732 separate from an upstream portion of the electrical circuit 700, the upstream portion may have a reduced volume, a lower weight, or both. As such, the upstream portion of the electrical circuit 700 may be more easily integrated into an apparatus or hat.

In some embodiments, a photovoltaic device 734 is electrically-coupled to the charging circuit 726. The photovoltaic device 734 is configured to receive light from the ambient environment of the electrical circuit 700 and convert such light into electrical energy. This electrical energy is supplied to the charging circuit 726 and may flow to at least one of the battery receptacle 704 or the light source 702. In some embodiments, a wireless charging device 736 is electrically coupled to the charging circuit. The wireless charging device 736 may be configured to receive electrical energy via magnetic coupling, capacitive coupling, or both. Such electrical energy is supplied to the charging circuit 726 and may flow to at least one of the battery receptacle 704 or the light source 702. It will be appreciated that the photovoltaic device 734 and the wireless charging device 736 may be used to recharge the one or more batteries 710 when such batteries are secondary batteries. Such recharging may postpone or eliminate a need to receive electrical energy from a direct source that is external to the electrical circuit 700.

Figure 7B:
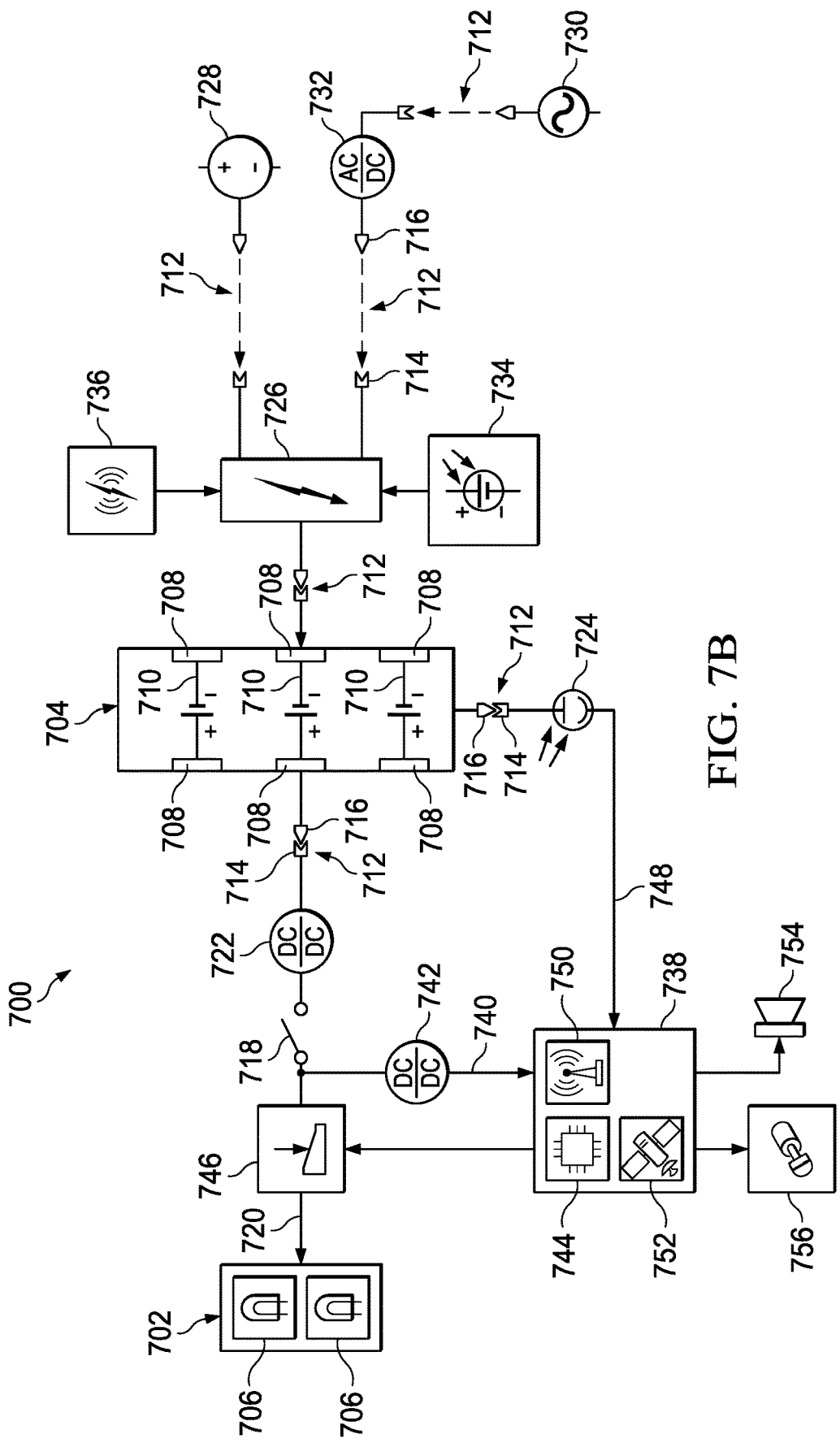
FIG. 7B is a schematic diagram of the electronic circuit of FIG. 7A, but in which the electric circuit includes a control circuit, according to an illustrative embodiment.

The electrical circuit 700 may include other components for communicating with a user of an apparatus or a hat, an observer of the apparatus or the hat, other electronic devices or systems, or a combination thereof. FIG. 7B presents a schematic diagram of the electrical circuit 700 of FIG. 7A, but in which the electrical circuit 700 includes a control circuit 738, according to an illustrative embodiment. The control circuit 738 is electrically-coupled to the battery receptacle 704 through a branching segment 740. The branching segment 740 originates at or downstream of the switch 718, which is configured as a binary-type switch. In this configuration, the segment 720 corresponds to a first main segment 720. The switch 718, when actuated, allows electrical energy to flow from the battery receptacle 704 to each of the light source 702 and the control circuit 738. In some embodiments, the DC-to-DC power converter 722 is a first DC-to-DC power converter and the branching segment 740 includes a second DC-to-DC power converter 742. The second DC-to-DC power converter 742 may be operable to receive electrical energy from the first main segment 720 and manipulate such energy to produce a voltage, a current, or both, suitable for the control circuit 738.

The control circuit 738 includes a processor 744 for sending electrical signals to a digital regulator 746. In many embodiments, the processor 744 includes a memory to assist in generating electrical signals. The digital regulator 746 controls a driving voltage, a driving current, or both, experienced by the light-emitting elements 706 of the light source 702. Such control may occur at a resolution that corresponds to individual light-emitting elements 706, groups of light-emitting elements 706, or the light source 702 as a whole. FIG. 7B depicts the digital regulator 746 as controlling the light source 702 as a whole. However, this depiction is not intended as limiting.

During operation, the digital regulator 746 receives electrical signals from the processor 744, and in response, alters driving voltages, the driving currents, or both, for the light-emitting elements 706. Such alteration may allow the control circuit 738 to selectively increase or decrease an intensity of light produced by each light-emitting element 706, groups of light-emitting elements 706, or the light source 702 as a whole. The digital regulator 746 may have an electrical interface that matches an electrical configuration of the light-emitting elements 706 (e.g., a series electrical configuration, a parallel electrical configuration, or some combination thereof). Although the digital regulator 746 is depicted in FIG. 7B as separate from the control circuit 738, in some embodiments, the digital regulator 746 is part (or integral to) of the control circuit 738.

The photosensor 724 may operate collectively with the control circuit 738 to increase or decrease an intensity of light produced the light source 702. In FIG. 7B, the photosensor 724 is disposed on a second main segment 748 of the electrical circuit 700. The second main segment 748 is operable to electrically-couple the battery receptacle 704 to the control circuit 738 and may include a pair of electrical connectors 712. A DC-to-DC power converter (not shown) may be disposed on the second main segment 748 upstream or downstream of the photosensor 724. The DC-to-DC power converter may be operable to receive electrical energy from the battery receptacle 704 (if upstream) or the photosensor 724 (if downstream) and manipulate such energy to produce a voltage, a current, or both, suitable for the control circuit 738.

During operation, the photosensor 724 measures an intensity of light in the ambient environment of the electrical circuit 700 (or apparatus or hat), and in response, alters a voltage, a current, or both, on the second main segment 748. This alteration signals the processor 744 of the control circuit 738 to instruct the digital regulator 746 to alter the driving voltage, the driving current, or both, experienced by the light source 702 (or light-emitting elements 706). For example, and without limitation, the photosensor 724 may decrease a voltage on the second main segment 748, which signals the processor 744, in turn, to instruct the digital regulator 746 to decrease the driving current. The processor 744 thus assists the photosensor 724 in dynamically altering an illumination of the exterior surface of the hat in response to measurements of ambient light conditions.

It will be appreciated that the control circuit 738 and the digital regulator 746 may allow the light source 702 to produce patterns of light, such as flashing lights, changes in emitted color, and so forth. Such patterns may depend on a location, an orientation, a group affiliation, and an emission-type of the light-emitting elements 706. A specific pattern may be determined by the processor 744 based on signals received by the control circuit 738. Patterns of light may be used to communicate with a user of an apparatus or a hat, an observer of the apparatus or the hat, or both. For example, and without limitation, the electric circuit 700 may energize only a portion of the light-emitting elements 706 (i.e., a group) to indicate a state-of-charge of the one or more batteries 710 (e.g., a percent state of charge, impending depletion, etc.). In another non-limiting example, the electronic circuit 700 may include a "panic" button that, when activated, causes the light source 702 to change a color of light emitted therefrom (e.g., from green to red). Such change may alert an observer that the user requires immediate attention (e.g., due to injury). In yet another non-limiting example, the electronic circuit 700 may rapidly cycle an intensity of light on and off. Such cycling may be based on the user entering a controlled location (e.g., an area of operation for equipment) and alert an observer (e.g., an equipment operator) that the user is present in the controlled location. The observer may otherwise be unaware of the user's presence.

In some embodiments, the control circuit 738 includes a wireless transceiver 750 electrically-coupled to the processor 744 and configured to convert wireless signals into electrical signals for the processor 744. The wireless signals may be any type of electromagnetic radiation capable of being received by or broadcast from an antenna. For example, and without limitation, the electromagnetic radiation may have one or more frequencies within a wavelength range from 1 kHz to 15 GHz. In some embodiments, the wireless signals conform to a wireless protocol, such as Bluetooth, IEEE 802.15.1, Wi-Fi®, IEEE 802.11, WiGig™, Z-Wave, IEEE 802.15.4, and Zigbee protocols. However, other types of wireless protocols are possible. The wireless transceiver 750 may exchange wireless signals with any electronic device or system having a suitably-configured wireless transceiver. Non-limiting examples of such electronic devices or systems include mobile phones, tablets, laptops, desktop computers, base stations, routers, repeaters, gateways, and embedded controllers. It will be appreciated that the wireless signals may include information instructing the control circuit 738 to produce a pattern of light with the light source 702 (or light-emitting elements 706).

In some embodiments, the control circuit 738 includes a Global Positioning System receiver 752 (or GPS receiver) electrically-coupled to the processor 744. The GPS receiver 752 is configured to convert a GPS signal from a GPS satellite into electrical signals for the processor 744 that represent positional information, such as a latitude, a longitude, and an altitude of the GPS receiver 752. Other information may also be present, e.g., a time the GPS signal was sent, a name of the GPS satellite, an authentication of the GPS satellite, and so forth. The processor 744 may communicate such information via the wireless transceiver 750 to an electronic device or system, and in return, receive instructions to produce patterns of light. In some embodiments, the electrical circuit 700 also includes a speaker 754 (or buzzer). The speaker 754 (or buzzer) may allow audible information to be communicated to the user, which may also be heard by an observer. For example, if the user enters a controlled location, an audible warning may sound in addition to a pattern of light being produced. In some embodiments, the electrical circuit 700 includes a vibration motor 756. The vibration motor 756 may allow the electrical circuit 700 to alert the user using vibrations or patterns of vibrations (e.g., on-off sequences, alterations in vibration intensity, alterations in vibration frequency, etc.).

According to an illustrative embodiment, a method for improving the noticeability of a hat includes producing light from a light source coupled to the hat. The light source is configured to produce light upon receiving electrical energy. The method additionally includes orienting the light source to project light away from an exterior surface of the hat into an ambient environment of the hat. The exterior surface includes at least one of a left-side exterior surface and a right-side exterior surface. In some embodiments, the exterior surface includes at least one of a front-side exterior surface and a rear-side exterior surface. In some embodiments, the exterior surface includes a band encircling the hat.

While orienting the light source, the method may optionally distribute light into the ambient environment using at least one of refractive element, a reflective element, a diffractive element, and an optically-transmissive element. The method may also optionally alter an amount of electrical energy received by the light source to alter an intensity of light produced therefrom. Altering the intensity of light may involve altering light produced by an individual light-emitting element, a group of light-emitting elements, or the light source as a whole. Alteration of light produced by the individual or group of light-emitting elements may be based on location, orientation, group affiliation, and emission-type. Other criteria are possible. It will be appreciated that altering the intensity of light may allow the light source to produce a pattern of light. In some embodiments, the amount of electrical energy is altered by a switch (e.g., a binary-type switch, a dimmer-type switch, etc.). In some embodiments, altering the amount of electrical energy includes altering the amount of electrical energy in response to an intensity of ambient light measured by a photosensor.

In some embodiments, the method involves supplying electrical energy to the light source from one or more batteries. The one or more batteries may supply such electrical energy for at least 10 cumulative hours. However, other numbers of cumulative hours are possible (e.g., for at least 12 cumulative hours, for at least 15 cumulative hours, for at least 18 cumulative hours, for at least 21 cumulative hours, etc.) The cumulative hours may correspond to an operational lifetime of the one or more batteries. The one or more batteries may be primary batteries or secondary batteries. In further embodiments, supplying electrical energy includes storing electrical energy in the one or more batteries. The one or more batteries may consist of secondary (or rechargeable) batteries. In still further embodiments, storing electrical energy includes receiving light into a photovoltaic device to produce electrical energy and storing electrical energy so-produced in the one or more batteries.

A light source associated with an apparatus, a hat, and a method of the present disclosure may illuminate an exterior surface of a hat according to an intensity of light. In some embodiments, the light source illuminates the exterior surface at an intensity of at least 20 lux. In some embodiments, the light source illuminates the exterior surface at an intensity of at least 50 lux. In some embodiments, the light source illuminates the exterior surface at an intensity of at least 100 lux. In some embodiments, the light source illuminates the exterior surface at an intensity of at least 150 lux. In some embodiments, the light source illuminates the exterior surface at an intensity of at least 200 lux. In some embodiments, the light source illuminates the exterior surface at an intensity of at least 250 lux. In some embodiments, the light source illuminates the exterior surface at an intensity of at least 500 lux. In some embodiments, the light source illuminates the exterior surface at an intensity of at least 750 lux.

In some embodiments, the light source illuminates the exterior surface at an intensity no greater than 1000 lux. In some embodiments, the light source illuminates the exterior surface at an intensity no greater than 750 lux. In some embodiments, the light source illuminates the exterior surface at an intensity no greater than 500 lux. In some embodiments, the light source illuminates the exterior surface at an intensity no greater than 250 lux. In some embodiments, the light source illuminates the exterior surface at an intensity no greater than 200 lux. In some embodiments, the light source illuminates the exterior surface at an intensity no greater than 150 lux. In some embodiments, the light source illuminates the exterior surface at an intensity no greater than 100 lux.

It will be understood that the lower and upper limits may be combined in any variation as above to define a range for the intensity. For example, and without limitation, the light source may illuminate the exterior surface at an intensity of at least 100 lux but no greater than 250 lux. In another non-limiting example, the light source may illuminate the exterior surface at an intensity of at least 20 lux but no greater than 150 lux. In yet another non-limiting example, the light source may illuminate the exterior surface at an intensity of at least 250 lux but no greater than 750 lux. Other ranges are possible.

A light source associated with an apparatus, a hat, and a method of the present disclosure may convert electrical energy into light according to an electrical conversion efficiency. In some embodiments, the light source has an electrical conversion efficiency of at least 10 lumens per watt. In some embodiments, the light source has an electrical conversion efficiency of at least 30 lumens per watt. In some embodiments, the light source has an electrical conversion efficiency of at least 50 lumens per watt. In some embodiments, the light source has an electrical conversion efficiency of at least 70 lumens per watt. In some embodiments, the light source has an electrical conversion efficiency of at least 90 lumens per watt. In some embodiments, the light source has an electrical conversion efficiency of at least 110 lumens per watt.

In some embodiments, the light source has an electrical conversion efficiency no greater than 130 lumens per watt. In some embodiments, the light source has an electrical conversion efficiency no greater than 110 lumens per watt. In some embodiments, the light source has an electrical conversion efficiency no greater than 90 lumens per watt. In some embodiments, the light source has an electrical conversion efficiency no greater than 70 lumens per watt. In some embodiments, the light source has an electrical conversion efficiency no greater than 50 lumens per watt. In some embodiments, the light source has an electrical conversion efficiency no greater than 30 lumens per watt.

It will be understood that the lower and upper limits may be combined in any variation as above to define a range for the electrical conversion efficiency. For example, and without limitation, the light source may have an electrical conversion efficiency of at least 50 lumens per watt but no greater than 90 lumens per watt. In another non-limiting example, the light source may have an electrical efficiency of at least 70 lumens per watt but no greater than 110 lumens per watt. In yet another non-limiting example, the light source may have an electrical efficiency of at least 70 lumens per watt but no greater than 130 lumens per watt. Other ranges are possible.

A battery receptacle associated with an apparatus, a hat, and a method of the present disclosure may be configured according to a maximum current capacity. In some embodiments, the battery receptacle is configured to hold one or more batteries collectively having a maximum current capacity of at least 250 mA·h. In some embodiments, the battery receptacle is configured to hold one or more batteries collectively having a maximum current capacity of at least 750 mA·h. In some embodiments, the battery receptacle is configured to hold one or more batteries collectively having a maximum current capacity of at least 1250 mA·h. In some embodiments, the battery receptacle is configured to hold one or more batteries collectively having a maximum current capacity of at least 1750 mA·h. In some embodiments, the battery receptacle is configured to hold one or more batteries collectively having a maximum current capacity of at least 2250 mA·h.

In some embodiments, the battery receptacle is configured to hold one or more batteries collectively having a maximum current capacity of no greater than 2750 mA·h. In some embodiments, the battery receptacle is configured to hold one or more batteries collectively having a maximum current capacity of no greater than 2250 mA·h. In some embodiments, the battery receptacle is configured to hold one or more batteries collectively having a maximum current capacity of no greater than 1750 mA·h. In some embodiments, the battery receptacle is configured to hold one or more batteries collectively having a maximum current capacity of no greater than 1250 mA·h. In some embodiments, the battery receptacle is configured to hold one or more batteries collectively having a maximum current capacity of no greater than 750 mA·h.

It will be understood that the lower and upper limits may be combined in any variation as above to define a range for the maximum current capacity. For example, and without limitation, the battery receptacle may be configured to hold one or more batteries collectively having a maximum current capacity of at least 250 mA·h but no greater than 750 mA·h. In another non-limiting example, the battery receptacle may be configured to hold one or more batteries collectively having a maximum current capacity of at least 1250 mA·h but no greater than 2250 mA·h. In yet another non-limiting example, the battery receptacle may be configured to hold one or more batteries collectively having a maximum current capacity of at least 750 mA·h but no greater than 1750 mA·h. Other ranges are possible.

The battery receptacle associated with an apparatus, a hat, and a method of the present disclosure may also be configured according to a maximum energy capacity. In some embodiments, the battery receptacle is configured to hold one or more batteries collectively having a maximum energy capacity of at least 0.5 W·h. In some embodiments, the battery receptacle is configured to hold one or more batteries collectively having a maximum energy capacity of at least 1 W·h. In some embodiments, the battery receptacle is configured to hold one or more batteries collectively having a maximum energy capacity of at least 3 W·h. In some embodiments, the battery receptacle is configured to hold one or more batteries collectively having a maximum energy capacity of at least 5 W·h. In some embodiments, the battery receptacle is configured to hold one or more batteries collectively having a maximum energy capacity of at least 7 W·h. In some embodiments, the battery receptacle is configured to hold one or more batteries collectively having a maximum energy capacity of at least 9 W·h.

In some embodiments, the battery receptacle is configured to hold one or more batteries collectively having a maximum energy capacity of no greater than 12 W·h. In some embodiments, the battery receptacle is configured to hold one or more batteries collectively having a maximum energy capacity of no greater than 9 W·h. In some embodiments, the battery receptacle is configured to hold one or more batteries collectively having a maximum energy capacity of no greater than 7 W·h. In some embodiments, the battery receptacle is configured to hold one or more batteries collectively having a maximum energy capacity of no greater than 5 W·h. In some embodiments, the battery receptacle is configured to hold one or more batteries collectively having a maximum energy capacity of no greater than 3 W·h. In some embodiments, the battery receptacle is configured to hold one or more batteries collectively having a maximum energy capacity of no greater than 1 W·h.

It will be understood that the lower and upper limits may be combined in any variation as above to define a range for the maximum energy capacity. For example, and without limitation, the battery receptacle may be configured to hold one or more batteries collectively having a maximum energy capacity of at least 1 W·h but no greater than 3 W·h. In another non-limiting example, the battery receptacle may be configured to hold one or more batteries collectively having a maximum energy capacity of at least 5 W·h but no greater than 9 W·h. In yet another non-limiting example, the battery receptacle may be configured to hold one or more batteries collectively having a maximum energy capacity of at least 0.5 W·h but no greater than 12 W·h. Other ranges are possible.

Although the present invention and its advantages have been disclosed in the context of certain illustrative, non-limiting embodiments, it should be understood that various changes, substitutions, permutations, and alterations can be made without departing from the scope of the invention as defined by the appended claims. It will be appreciated that any feature that is described in connection to any one embodiment may also be applicable to any other embodiment.

It will be understood that the benefits and advantages described above may relate to one embodiment or may relate to several embodiments. It will further be understood that reference to "an" item refers to one or more of those items.

The steps of the methods described herein may be carried out in any suitable order or simultaneous where appropriate. Where appropriate, aspects of any of the examples described above may be combined with aspects of any of the other examples described to form further examples having comparable or different properties and addressing the same or different problems.

It will be understood that the above description of the embodiments is given by way of example only and that various modifications may be made by those skilled in the art. The above specification, examples, and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the scope of the claims.

The illustrative apparatus, hats, and methods, described herein may also be described by the following non-limiting examples:

Example 1

An apparatus for improving the noticeability of a hat, the apparatus comprising:
a light source configured to produce light upon receiving electrical energy;
a mount coupled to the light source and configured to selectively attach to and detach from the hat;
a battery receptacle electrically-coupled to the light source and having electrical contacts for coupling to one or more batteries; and
wherein the mount, when attached to the hat, orients the light source to project light away from an exterior surface of the hat into an ambient environment of the hat, the exterior surface comprising at least one of a left-side exterior surface and a right-side exterior surface.

Example 2

The apparatus of example 1, wherein the light source is configured to project light away from the exterior surface at an intensity of at least 20 lux.

Example 3

The apparatus of example 1 or example 2, wherein the light source has an electrical conversion efficiency of at least 30 lumens per watt.

Example 4

The apparatus of example 1 or any one of examples 2-3, wherein the exterior surface comprises at least one of a front-side exterior surface and a rear-side exterior surface.

Example 5

The apparatus of example 1 or any one of examples 2-3, wherein the exterior surface comprises a band encircling the hat.

Example 6

The apparatus of example 1 or any one of examples 2-5, wherein the battery receptacle is disposed within the mount.

Example 7

The apparatus of example 1 or any one of examples 2-5, wherein the battery receptacle is configured to selectively attach to and detach from the mount.

Example 8

The apparatus of example 1 or any one of examples 2-7, wherein the battery receptacle comprises the one or more batteries.

Example 9

The apparatus of example 8, wherein the one or more batteries are primary batteries.

Example 10

The apparatus of example 8, wherein the one or more batteries are secondary batteries.

Example 11

The apparatus of example 8 or any one of examples 9-10, wherein the battery receptacle is sealed such that the one or more batteries are non-removable.

Example 12

The apparatus of example 1 or any one of examples 2-11, comprising:
a switch configured to regulate a flow of electrical energy from the battery receptacle to the light source.

Example 13

The apparatus of example 1 or any one of examples 2-12, comprising:
a photosensor configured to measure an intensity of light in the ambient environment, and in response, regulate the flow of electrical energy from the battery receptacle to the light source.

Example 14

The apparatus of example 1 or any one of examples 2-13, comprising:
a charging circuit electrically-coupled to the battery receptacle and configured to regulate at least one of a charging voltage and a charging current supplied thereto.

Example 15

The apparatus of example 14, comprising:
a photovoltaic device coupled to the mount and electrically-coupled to the charging circuit; and
wherein mount, when attached to the hat, orients the photovoltaic device to receive light from the ambient environment.

Example 16

The apparatus of example 14 or example 15, comprising:
a wireless charging device coupled to the mount and electrically-coupled to the charging circuit.

Example 17

The apparatus of example 1 or any one of examples 2-16, comprising:
a control circuit electrically-coupled to the light source and the battery receptacle and comprising a processor and a wireless transceiver, the control circuit configured to control at least one of a driving current and a driving voltage for the light source.

Example 18

The apparatus of example 17, wherein the control circuit comprises a GPS receiver electrically-coupled to the processor.

Example 19

The apparatus of example 1 or any one of examples 2-18, wherein the battery receptacle is configured to hold one or more batteries collectively having a maximum current capacity of at least 750 mA·h.

Example 20

The apparatus of example 1 or any one of examples 2-19, wherein the battery receptacle is configured to hold one or more batteries collectively having a maximum energy capacity of at least 1 W·h.

Example 21

The apparatus of example 1 or any one of examples 2-20, wherein the mount comprises a clip configured to insert into an orifice of the hat.

Example 22

The apparatus of example 1 or any one of examples 2-21, wherein the mount comprises a circumferential member configured to encircle a perimeter of the hat.

Example 23

The apparatus of example 1 or 5 or any one of examples 2-3 and 6-21,
wherein the mount comprises a circumferential member configured to encircle a perimeter of the hat; and
wherein the light source comprises a plurality of light sources disposed on the circumferential member.

Example 24

The apparatus of example 1 or any one of examples 2-23, wherein the light source comprises at least one of a refractive element, a reflective element, a diffractive element, and an optically-transmissive element.

Example 25

The apparatus of example 1 or any one of examples 2-24, wherein the light source is configured to emit a broad-band emission of light.

Example 26

The apparatus of example 1 or any one of examples 2-25, wherein the light source is configured to emit a narrow-band emission of light.

Example 27

The apparatus of example 26, wherein the narrow-band emission of light is an emission of green light.

Example 28

The apparatus of example 1 or any one of examples 2-27, wherein the light source comprises a light-emitting diode.

Example 29

A hat having improved noticeability, the hat comprising:
an exterior surface that is visible when the hat is worn, the exterior surface comprising at least one of a left-side exterior surface and a right-side exterior surface;
a light source coupled to the hat and operable to produce light upon receiving electrical energy, the light source configured to project light away from the exterior surface into an ambient environment of the hat; and
a battery receptacle electrically-coupled to the light source and having electrical contacts for coupling to one or more batteries.

Example 30

The hat of example 29, wherein the light source is configured to project light away from the exterior surface at an intensity of at least 20 lux.

Example 31

The hat of example 29 or example 30, wherein the light source has an electrical conversion efficiency of at least 30 lumens per watt.

Example 32

The hat of example 29 or any one of examples 30-31, wherein the exterior surface comprises at least one of a front-side exterior surface and a rear-side exterior surface.

Example 33

The hat of example 29 or any one of examples 30-31, wherein the exterior surface comprises a band encircling the hat.

Example 34

The hat of example 29 or any one of examples 30-33, wherein the battery receptacle is configured to selectively attach to and detach from the hat.

Example 35

The hat of example 29 or any one of examples 30-34, wherein the battery receptacle comprises the one or more batteries.

Example 36

The hat of example 35, wherein the one or more batteries are primary batteries.

Example 37

The hat of example 35, wherein the one or more batteries are secondary batteries.

Example 38

The hat of example 35 or any one of examples 36-47, wherein the battery receptacle is sealed such that the one or more batteries are non-removable.

Example 39

The hat of example 29 or any one of examples 30-38, wherein the battery receptacle is configured to hold one or more batteries collectively having a maximum current capacity of at least 750 mA·h.

Example 40

The hat of example 29 or any one of examples 30-39, wherein the battery receptacle is configured to hold one or more batteries collectively having a maximum energy capacity of at least 1 W·h.

Example 41

The hat of example 29 or any one of examples 30-40, comprising:
a switch configured to regulate a flow of electrical energy from the battery receptacle to the light source.

Example 42

The hat of example 29 or any one of examples 30-41, comprising:
a photosensor configured to measure an intensity of light in an ambient environment of the hat and, in response, regulate the flow of electrical energy from the battery receptacle to the light source.

Example 43

The hat of example 29 or any one of examples 30-42, comprising:
a charging circuit electrically-coupled to the battery receptacle and configured to regulate at least one of a charging voltage and a charging current supplied thereto.

Example 44

The hat of example 43, comprising:
a photovoltaic device coupled to the hat and oriented to receive light from an ambient environment thereof, the photovoltaic device electrically-coupled to the charging circuit.

Example 45

The hat of example 43 or example 44, comprising:
a wireless charging device coupled to the hat and electrically-coupled to the charging circuit.

Example 46

The hat of example 29 or any one of examples 30-45, comprising:
a control circuit electrically-coupled to the light source and the battery receptacle and comprising a processor and a wireless transceiver, the control circuit configured to control at least one of a driving current and a driving voltage for the light source.

Example 47

The hat of example 46, wherein the control circuit comprises a GPS receiver electrically-coupled to the processor.

Example 48

The hat of example 29 or any one of examples 30-47, comprising:
a mount coupling the light source to the hat and configured to selectively attach to and detach from the hat; and
wherein the mount, when attached to the hat, orients the light source to project light away from the exterior surface into the ambient environment of the hat.

Example 49

The hat of example 48, comprising an orifice for receiving a clip of the mount.

Example 50

The hat of example 29 or any one of examples 30-49, wherein the light source comprises at least one of a refractive element, a reflective element, a diffractive element, and an optically-transmissive element.

Example 51

The hat of example 29 or 33 or any one of examples 30-31 and 33-50, wherein the light source comprises a plurality of light sources disposed along a perimeter of the hat.

Example 52

The hat of example 29 or any one of examples 30-51, wherein the light source is configured to emit a broad-band emission of light.

Example 53

The hat of example 29 or any one of examples 30-52, wherein the light source is configured to emit a narrow-band emission of light.

Example 54

The hat of example 53, wherein the narrow-band emission of light is an emission of green light.

Example 55

The hat of example 29 or any one of examples 30-54, wherein the light source comprises a light-emitting diode.

Example 56

A method for improving the noticeability of a hat, the method comprising:
producing light from a light source coupled to the hat;
orienting the light source to project light away from an exterior surface of the hat into an ambient environment of the hat, the exterior surface comprising at least one of a left-side exterior surface and a right-side exterior surface; and
wherein the light source is configured to produce light upon receiving electrical energy.

Example 57

The method of example 56, wherein producing light from the light source includes producing light at an intensity of at least 20 lux.

Example 58

The method of example 56 or example 57, wherein the light source is configured to produce at least 30 lumens of light per watt of electrical energy received.

Example 59

The method of example 56 or any one of examples 57-58, wherein the exterior surface comprises at least one of a front-side exterior surface and a rear-side exterior surface.

Example 60

The method of example 56 or any one of examples 57-58, wherein the exterior surface comprises a band encircling the hat.

Example 61

The method of example 56 or any one of examples 57-60, comprising:
while orienting the light source, distributing light into the ambient environment using at least one of a refractive element, a reflective element, a diffractive element, and an optically-transmissive element.

Example 62

The method of example 56 or any one of examples 57-61, comprising:
  supplying electrical energy to the light source from one or more batteries.

Example 63

The method of example 62, wherein supplying the electrical energy to the light source occurs for at least 10 cumulative hours.

Example 64

The method of example 62 or example 63, wherein supplying electrical energy comprises:
  storing electrical energy in the one or more batteries, the one or more batteries consisting of rechargeable batteries.

Example 65

The method of example 64, wherein storing electrical energy comprises:
  receiving light into a photovoltaic device to produce electrical energy; and
  storing electrical energy so-produced in the one or more batteries.

Example 66

The method of example 64 or example 65, wherein storing electrical energy comprises:
  receiving a magnetic flux in a first wireless charging device to produce electrical energy; and
  storing electrical energy so-produced in the one or more batteries.

Example 67

The method of example 64 or any one of examples 65-66, wherein storing electrical energy comprises:
  receiving an electric field in a second wireless charging device to produce electrical energy; and
  storing electrical energy so-produced in the one or more batteries.

Example 68

The method of example 56 or any one of examples 57-67, comprising:
  altering an amount of electrical energy received by the light source to alter an intensity of light produced therefrom.

Example 69

The method of example 68, wherein altering the amount of electrical energy comprises:
  altering the amount of electrical energy in response to an intensity of ambient light measured by a photosensor.

Example 70

The method of example 68 or example 69, wherein altering the amount of electrical energy comprises:
  producing a first pattern of light in response to a wireless signal received by a wireless transceiver, the wireless signal representing information that defines the pattern of light to be produced.

Example 71

The method of example 68 or any one of examples 69-70, wherein altering the amount of electrical energy comprises:
  producing a second pattern of light in response to a GPS signal received by a GPS receiver, the GPS signal representing a location of the hat.

Example 72

The method of example 56 or any one of examples 57-71, wherein the light source is coupled to the hat through a mount configured to selectively attach to and detach from the hat.

Example 73

The method of example 56 or any one of examples 57-72, wherein the light source produces a broad-band emission of light.

Example 74

The method of example 56 or any one of examples 57-73, wherein the light source produces a narrow-band emission of light.

Example 75

The method of example 74, wherein the narrow-band emission of light is an emission of green light.

What is claimed is:

1. An apparatus for improving the noticeability of a hat, the apparatus comprising:
  a light source configured to produce light upon receiving electrical energy;
  a mount coupled to the light source and configured to selectively attach to and detach from the hat; and
  a battery receptacle electrically-coupled to the light source and having electrical contacts for coupling to one or more batteries;
  wherein the mount, when attached to the hat:
    contacts a brim of the hat or a surface defining an orifice of the hat, and
    orients the light source to project light away from an exterior surface of the hat into an ambient environment of the hat, the exterior surface comprising at least one of a left-side exterior surface and a right-side exterior surface.

2. The apparatus of claim 1, wherein the light source comprises at least one of a refractive element, a reflective element, a diffractive element, and an optically-transmissive element.

3. The apparatus of claim 1, wherein the mount comprises a clip configured to insert into the orifice of the hat.

4. The apparatus of claim 1,
  wherein the mount comprises a circumferential member configured to encircle a perimeter of the hat; and wherein the exterior surface comprises a band encircling the hat.

5. The apparatus of claim 1, comprising:
a switch configured to regulate a flow of electrical energy from the battery receptacle to the light source.

6. The apparatus of claim 1, comprising:
a charging circuit electrically-coupled to the battery receptacle and configured to regulate at least one of a charging voltage and a charging current supplied thereto.

7. The apparatus of claim 6, comprising:
a photovoltaic device coupled to the mount and electrically-coupled to the charging circuit; and
wherein mount, when attached to the hat, orients the photovoltaic device to receive light from the ambient environment.

8. The apparatus of claim 6, comprising:
a wireless charging device coupled to the mount and electrically-coupled to the charging circuit.

9. The apparatus of claim 1, wherein the battery receptacle is disposed within the mount.

10. The apparatus of claim 1, wherein the battery receptacle is configured to selectively attach to and detach from the mount.

11. The apparatus of claim 1, wherein the light source is configured to project light away from the exterior surface at an intensity of at least 20 lux.

12. The apparatus of claim 1, wherein the light source has an electrical conversion efficiency of at least 30 lumens per watt.

13. The apparatus of claim 1, wherein the exterior surface comprises at least one of a front-side exterior surface and a rear-side exterior surface.

14. The apparatus of claim 1, wherein the battery receptacle comprises the one or more batteries.

15. The apparatus of claim 14, wherein the one or more batteries are primary batteries.

16. The apparatus of claim 14, wherein the one or more batteries are secondary batteries.

17. The apparatus of claim 14, wherein the battery receptacle is sealed such that the one or more batteries are non-removable.

18. The apparatus of claim 1, comprising:
a photosensor configured to measure an intensity of light in the ambient environment, and in response, regulate a flow of electrical energy from the battery receptacle to the light source.

19. The apparatus of claim 1, comprising:
a control circuit electrically-coupled to the light source and the battery receptacle and comprising a processor and a wireless transceiver, the control circuit configured to control at least one of a driving current and a driving voltage for the light source.

20. The apparatus of claim 19, wherein the control circuit comprises a GPS receiver electrically-coupled to the processor.

21. The apparatus of claim 1, wherein the battery receptacle is configured to hold one or more batteries collectively having a maximum current capacity of at least 750 mA·h.

22. The apparatus of claim 1, wherein the battery receptacle is configured to hold one or more batteries collectively having a maximum energy capacity of at least 1 W·h.

23. The apparatus of claim 1,
wherein the mount comprises a circumferential member configured to encircle a perimeter of the hat; and
wherein the light source comprises a plurality of light sources disposed on the circumferential member.

24. The apparatus of claim 1, wherein the light source is configured to emit a broad-band emission of light.

25. The apparatus of claim 1, wherein the light source is configured to emit a narrow-band emission of light.

26. The apparatus of claim 25, wherein the narrow-band emission of light is an emission of green light.

27. The apparatus of claim 1, wherein the light source comprises a light-emitting diode.

28. The apparatus of claim 1, wherein a gap separates the light source from the exterior surface when the mount is attached the hat.

29. A hat having improved noticeability, the hat comprising:
a light source coupled to a brim of the hat or a surface defining an orifice of the hat, the light source operable to produce light upon receiving electrical energy and configured to project light away from an exterior surface of the hat into an ambient environment of the hat, the exterior surface comprising at least one of a left-side exterior surface and a right-side exterior surface; and
a battery receptacle electrically-coupled to the light source and having electrical contacts for coupling to one or more batteries.

30. The hat of claim 29, comprising:
a mount coupling the light source to the hat and configured to selectively attach to and detach from the hat;
wherein the mount, when attached to the hat:
contacts the brim of the hat or the surface defining the orifice of the hat, and
orients the light source to project light away from the exterior surface of the hat into the ambient environment of the hat.

31. The hat of claim 30, comprising an orifice for receiving a clip of the mount.

32. The hat of claim 29, wherein the exterior surface of the hat comprises at least one of a front-side exterior surface and a rear-side exterior surface.

33. The hat of claim 29, wherein the exterior surface of the hat comprises a band encircling the hat.

34. The hat of claim 29, wherein the light source comprises a plurality of light sources disposed along a perimeter of the hat.

35. The hat of claim 29, wherein the battery receptacle is configured to selectively attach to and detach from the hat.

36. The hat of claim 29, comprising:
a charging circuit electrically-coupled to the battery receptacle and configured to regulate at least one of a charging voltage and a charging current supplied thereto.

37. The hat of claim 36, comprising:
a photovoltaic device coupled to the hat and oriented to receive light from an ambient environment thereof, the photovoltaic device electrically-coupled to the charging circuit.

38. The hat of claim 36, comprising:
a wireless charging device coupled to the hat and electrically-coupled to the charging circuit.

39. The hat of claim 29, wherein the light source is configured to project light away from the exterior surface at an intensity of at least 20 lux.

40. The hat of claim 29, wherein the light source has an electrical conversion efficiency of at least 30 lumens per watt.

41. The hat of claim 29, wherein the battery receptacle comprises the one or more batteries.

42. The hat of claim 41, wherein the one or more batteries are primary batteries.

43. The hat of claim 41, wherein the one or more batteries are secondary batteries.

44. The hat of claim 41, wherein the battery receptacle is sealed such that the one or more batteries are non-removable.

45. The hat of claim 29, wherein the battery receptacle is configured to hold one or more batteries collectively having a maximum current capacity of at least 750 mA·h.

46. The hat of claim 29, wherein the battery receptacle is configured to hold one or more batteries collectively having a maximum energy capacity of at least 1 W·h.

47. The hat of claim 29, comprising:
a switch configured to regulate a flow of electrical energy from the battery receptacle to the light source.

48. The hat of claim 29, comprising:
a photosensor configured to measure an intensity of light in an ambient environment of the hat and, in response, regulate the flow of electrical energy from the battery receptacle to the light source.

49. The hat of claim 29, comprising:
a control circuit electrically-coupled to the light source and the battery receptacle and comprising a processor and a wireless transceiver, the control circuit configured to control at least one of a driving current and a driving voltage for the light source.

50. The hat of claim 49, wherein the control circuit comprises a GPS receiver electrically-coupled to the processor.

51. The hat of claim 29, wherein the light source comprises at least one of a refractive element, a reflective element, a diffractive element, and an optically-transmissive element.

52. The hat of claim 29, wherein the light source is configured to emit a broad-band emission of light.

53. The hat of claim 29, wherein the light source is configured to emit a narrow-band emission of light.

54. The hat of claim 53, wherein the narrow-band emission of light is an emission of green light.

55. The hat of claim 29, wherein the light source comprises a light-emitting diode.

56. The hat of claim 29, wherein a gap separates the light source from the exterior surface.

57. A method for improving the noticeability of a hat, the method comprising:
producing light from a light source coupled to a brim of the hat or a surface defining an orifice of the hat; and
orienting the light source to project light away from an exterior surface of the hat into an ambient environment of the hat, the exterior surface comprising at least one of a left-side exterior surface and a right-side exterior surface;
wherein the light source is configured to produce light upon receiving electrical energy.

58. The method of claim 57, comprising:
while orienting the light source, distributing light into the ambient environment using at least one of a refractive element, a reflective element, a diffractive element, and an optically-transmissive element.

59. The method of claim 57, comprising:
altering an amount of electrical energy received by the light source to alter an intensity of light produced therefrom.

60. The method of claim 59, wherein altering the amount of electrical energy comprises:
altering the amount of electrical energy in response to an intensity of ambient light measured by a photosensor.

61. The method of claim 59, wherein altering the amount of electrical energy comprises:
producing a pattern of light in response to a wireless signal received by a wireless transceiver, the wireless signal representing information that defines the pattern of light to be produced.

62. The method of claim 59, wherein altering the amount of electrical energy comprises:
producing a pattern of light in response to a GPS signal received by a GPS receiver, the GPS signal representing a location of the hat.

63. The method of claim 57, wherein producing light from the light source comprises producing light at an intensity of at least 20 lux.

64. The method of claim 57, wherein the light source is configured to produce at least 30 lumens of light per watt of electrical energy received.

65. The method of claim 57, wherein the exterior surface comprises at least one of a front-side exterior surface and a rear-side exterior surface.

66. The method of claim 57, wherein the exterior surface comprises a band encircling the hat.

67. The method of claim 57, comprising:
supplying electrical energy to the light source from one or more batteries.

68. The method of claim 67, wherein supplying the electrical energy to the light source occurs for at least 10 cumulative hours.

69. The method of claim 57,
storing electrical energy in one or more batteries electrically-coupled to the light source, the one or more batteries consisting of rechargeable batteries.

70. The method of claim 69, wherein storing electrical energy in one or more batteries comprises:
receiving light into a photovoltaic device to produce electrical energy; and
storing the electrical energy so-produced in the one or more batteries.

71. The method of claim 69, wherein storing electrical energy comprises:
receiving a magnetic flux in a wireless charging device to produce electrical energy; and
storing the electrical energy so-produced in the one or more batteries.

72. The method of claim 69, wherein storing electrical energy in one or more batteries comprises:
receiving an electric field in a wireless charging device to produce electrical energy; and
storing the electrical energy so-produced in the one or more batteries.

73. The method of claim 57,
wherein the light source is coupled to the hat through a mount;
wherein the method comprises attaching the mount to the hat; and
wherein the mount, when attached to the hat, contacts the brim of the hat or the surface defining the orifice of the hat.

74. The method of claim 73, wherein the method comprises:
stopping a flow of electrical energy to the light source, thereby stopping the production of light from the light source; and
detaching the mount from the hat to uncouple the light source from the hat.

75. The method of claim 57, wherein the light source produces a broad-band emission of light.

76. The method of claim 57, wherein the light source produces a narrow-band emission of light.

77. The method of claim 76, wherein the narrow-band emission of light is an emission of green light.

78. The method of claim 57, wherein a gap separates the light source from the exterior surface.

* * * * *